US007455587B2

(12) United States Patent
Olive et al.

(10) Patent No.: US 7,455,587 B2
(45) Date of Patent: Nov. 25, 2008

(54) INTERACTIVE FEATURE GAME

(75) Inventors: Scott Christopher Olive, Lane Cove (AU); Naomi Glasson, Lane Cove (AU); Brett Mezen, Lane Cove (AU)

(73) Assignee: Aristocrat Technologies Australia Pty. Ltd. (AU)

( * ) Notice: Subject to any disclaimer, the term of this patent is extended or adjusted under 35 U.S.C. 154(b) by 393 days.

(21) Appl. No.: 10/949,118

(22) Filed: Sep. 15, 2004

(65) Prior Publication Data

US 2005/0113162 A1 May 26, 2005

(51) Int. Cl.
*A63F 13/00* (2006.01)
*A63F 9/24* (2006.01)
*G06F 17/00* (2006.01)
*G06F 19/00* (2006.01)

(52) U.S. Cl. ...................... 463/16; 273/317.5; 273/408; 273/409

(58) Field of Classification Search ............... 463/1-57; 273/138.1, 317, 49
See application file for complete search history.

(56) References Cited

U.S. PATENT DOCUMENTS

| | | | | | |
|---|---|---|---|---|---|
| 3,979,117 | A | * | 9/1976 | Worsham | 273/408 |
| 4,681,325 | A | * | 7/1987 | Sheem | 273/348.3 |
| 4,893,822 | A | * | 1/1990 | Tesa et al. | 273/376 |
| 5,156,643 | A | * | 10/1992 | Grubek | 273/376 |
| 5,197,743 | A | * | 3/1993 | Hanson, Jr. | 273/378 |
| 5,601,487 | A | | 2/1997 | Oshima et al. | 463/4 |
| 5,664,782 | A | * | 9/1997 | Lacks et al. | 273/317.5 |
| 5,971,397 | A | * | 10/1999 | Miguel et al. | 273/371 |
| 6,007,427 | A | | 12/1999 | Wiener et al. | 463/17 |
| 6,050,895 | A | | 4/2000 | Luciano et al. | |
| 6,234,900 | B1 | | 5/2001 | Cumbers | |
| 6,319,123 | B1 | | 11/2001 | Paludi | 463/20 |
| 6,335,731 | B1 | * | 1/2002 | Yamamoto | 345/420 |
| 6,462,720 | B1 | * | 10/2002 | Yamashita et al. | 345/4 |
| 6,527,270 | B2 | | 3/2003 | Maksymec et al. | 273/138.1 |
| 6,572,471 | B1 | | 6/2003 | Bennett | 463/16 |
| 2001/0046893 | A1 | | 11/2001 | Giobbi et al. | 463/24 |
| 2002/0094859 | A1 | * | 7/2002 | Hirsch et al. | 463/19 |
| 2002/0153656 | A1 | | 10/2002 | Maksymec et al. | 273/138.1 |
| 2003/0114219 | A1 | | 6/2003 | McClintic | |

FOREIGN PATENT DOCUMENTS

| | | |
|---|---|---|
| EP | 0844580 | 11/1998 |
| EP | 1205894 | 5/2002 |
| GB | 2 231 189 | 11/1990 |

* cited by examiner

*Primary Examiner*—Robert E Pezzuto
*Assistant Examiner*—Paul Anthony D'Agostino
(74) *Attorney, Agent, or Firm*—McAndrews, Held & Malloy, Ltd

(57) ABSTRACT

A gaming machine comprises a display, a game player input means and a game controller arranged to control images displayed on the display. The game controller controls play of a game in which a winning game result causes a prize to be awarded to a game player. The game comprises an interactive sequence related to a tournament in which a representation of a first video-player of one team is displayed. An action of the first video-player to be executed is selected by the game player via the game player input means and the game controller selects an action to be performed by another video-player. Depending on an outcome resulting from the selected actions, an award is made to the game player.

32 Claims, 18 Drawing Sheets

INTERACTIVE FEATURE GAME

CROSS-REFERENCE TO RELATED APPLICATIONS

The present application claims priority from Provisional Patent Application No. 2003905196 filed on 24 Sep. 2003, the contents of which are incorporated herein by reference

FIELD OF THE INVENTION

The present invention relates generally to the field of gaming. More particularly, the invention relates to a gaming system, to a gaming machine and to a new game which may be offered as a main game on a gaming machine but which is particularly advantageous as a bonus game.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

Throughout this specification the term "game player" is used to indicate a person playing the gaming machine on which the invention is implemented, and the term "video player" is used to indicate a character in a game provided on the gaming machine.

Throughout this specification the word "comprise", or variations such as "comprises" or "comprising", are to be understood to imply the inclusion of a stated element, integer or step, group of elements, integers or steps, but not the exclusion of any other element, integer or step, group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to a first aspect of the invention, there is provided a gaming machine which comprises a display, a game player input means and a game controller arranged to control images displayed on the display, the game controller controlling play of a game in which a winning game result causes a prize to be awarded to a game player, wherein the game comprises an interactive sequence related to a tournament in which a representation of a first video-player of one team is displayed, an action of the first video-player to be executed being selected by the game player via the game player input means and in which the game controller selects an action to be performed by another video-player and, depending on an outcome resulting from the selected actions, an award is made to the game player.

According to a second aspect of the invention, there is provided a gaming system which includes a gaming server;

a plurality of gaming machines; and a communications system connecting each of the plurality of gaming machines to the gaming server, each gaming machine comprising a display, a game player input means and a game controller arranged to control images displayed on the display, the game controller controlling play of a game on the gaming machine in which a winning game result causes a prize to be awarded to a game player, wherein the game played on at least one of the gaming machines comprises an interactive sequence related to a tournament in which a representation of a first video player of one team is displayed, an action of the first video player to be executed being selected by the game player via the game player input means and in which the game controller selects an action to be performed by another video player and, depending on an outcome resulting from the selected actions, an award is made to the game player.

The game may comprise one game sequence and the award may then be a prize awarded according to the outcome of the single game sequence. However, preferably, the game comprises a plurality of game sequences each of which is awarded points. The points may be accumulated and a prize awarded depending on the number of points accumulated by one of (a) the end of the game sequences and (b) when some other predetermined milestone has been reached.

The prize to be awarded may be dependent on in which one of a plurality of ranges of values the accumulated points tally falls. The ranges may correspond to different categories of jackpot pools with a top range corresponding to a top jackpot pool, and the other ranges corresponding to jackpot pools of correspondingly lower values, at least the top jackpot being a progressive pool. All the jackpot pools may be progressive pools to which contributions are made for each stake wagered in each game played on the system (or machine in the case of a stand alone machine).

The action selected by the gaming machine in response to the game player selected action may be an action by a video-player in the same team or the opposing team depending on the type of tournament.

In the case of a particularly preferred example, the game is soccer (football in UK and Europe) and the action required to be selected by the game player may be the direction in which a penalty goal in the soccer tournament is to be aimed. For example, the game player may be given the choice of his or her video-player shooting toward a point just inside any of the four corners of a goal or toward a point in the centre of the goal just below the cross bar or just above the ground.

The controller selected response may be to make a goal-keeper move either in a direction to "save" the goal or in a direction to miss saving the goal. Clearly, therefore in this case the machine selected response is by a video-player of the opposing team.

However in other examples such as American Football (NFL) or Australian Rules Football (AFL), the game player's video-player might pass the ball to another, game player selected, video-player on the same team, and the machine generated response might be to cause the receiving video-player to attempt a kick at a field goal. The pass might be successful or unsuccessful and the field goal attempt might also be successful or unsuccessful and the game player may be awarded points or prizes depending upon the outcome. In this case the machine generated response involves a video-player on the same team as the game player's video-player.

Preferably, each video-player has an indicium associated with it, the indicium being representative of a number of points to be awarded to the game player in the event of a successful outcome. For example, each video-player may wear or be represented by a shirt with a number on the shirt being representative of the number of points to be awarded for a successful outcome. Thus, in the case of the soccer game, the video-players will have the numbers 1 to 11 corresponding to the eleven team members in a soccer team and the game player will be awarded points for a successful shot at goal (i.e. not saved by the goalie) equal to the number on the shirt representative of the video-player taking the shot. In the case of other games such as NFL or AFL the number on the shirt of each video-player will accord with the rules of the respective game. However in a variation of the basic game concept, the numbers carried by the video-players might extend beyond the number permitted on the field by the rules of the respective sporting association in order to allow for substitute video-players. As is common in competitions such as NFL, the number of video-players on a team might be much greater than the number of video-players allowed on the field during play. Also some famous sportsmen always play in the same numbered shirt, such as Michael Jordan who made the number 23 shirt famous. In some embodiments of the game, video-players may be portrayed as members of one or other of the teams represented in the game and will carry the number by which they are known in real life. In such embodiments the teams may play in the colours of real sporting teams and whole teams of video-players might correspond to real life video-players.

Each video-player for which the game player selects an action may be allocated by the game controller (eg randomly selected), in which case there may be no weighting placed on the outcomes of different video-players. However, it is also possible for the game player to select the video-player to take the action, in which case there may be weightings associated with the success rates of various video-players. For example a video-player with a high number (and hence high score potential), might have a lower probability of success than a video player with a lower number. Of course in the case where numbers of real individuals are used, the pseudo-skill of the video-player might also be related to statistics of the real life video-player, in which case their skill will in all probability not be in any way related to their allocated number. In this case a different method of scoring might be required such as allocation of a score, unrelated to their number, to each video-player. The defenders might also have different pseudo-skill levels in such an example and will typically be allocated by the gaming machine.

A score allocated to a successful game sequence may also be related to the action selected by the game player. For example in an NFL game, the game player might have the option of passing to one of three other video-players. These video-players might be placed in locations on the field where it is difficult or easy to receive the pass and complete the play. Further the video-players might be in locations where it is possible to score a touchdown or a field goal. In these instances the score for successfully receiving a difficult pass might be greater than for receiving an easier pass. The score might also be higher again if the video-player scores a touchdown or a field goal.

In a particularly preferred embodiment of the invention, additional bonus points are awarded to the game player if an additional bonus event occurs during a game sequence. The additional bonus event may be randomly triggered and may be related or unrelated to the tournament depicted in the game. An example of an unrelated event might be the appearance of a streaker on the field of play (chassed off by the referee or umpire). In the soccer embodiment mentioned previously, a bonus of 10 points is awarded if a streaker appears. Of course there might be any number of other different unrelated bonus events that might result in bonus points being awarded. An example of a related bonus event in the soccer game mentioned above is the awarding of a free kick. This is signalled by the referee blowing his whistle and the same video-player who shot immediately previously being giver another shot. The points awarded for a successful free kick will preferably be the same as for a normal shot, the bonus being in the fact that an extra shot is provided and the potential additional points also contribute to the final score that determines which if any of the jackpot prizes the game player will win.

Examples of other game types and actions that might be provided in embodiments of the present invention are:

1) NFL—where the game player selects the receiver and the score is related to the receiver's number. The probability of success may be related to the inverse of the points awarded.

2) netball/basketball—where the game player selects the shooting position of the video-player. Points may be as per basketball scoring (i.e. 3 points from behind the 3 point line, 2 points from anywhere else and one point for a penalty shot). Alternatively the points might be a combination of the video-player number and the shooting position (eg the video-player number might be multiplied by the shooting position score). Additional points might be awarded for a slam dunk.

3) AFL—The achievement of a goal may result in a 6 point multiplier as compared with a behind (when the ball misses the main goal posts but goes inside a second wider set of goal posts).

4) Rugby League (NRL)—similar options for game features as for the NFL game described above.

5) Cricket—The game player may choose the direction of "shot", and the controller can choose if the ball is caught by an opposing video-player. The shot direction may decide (or contribute to a decision as to whether a successful shot will achieve) a 6 point multiplier (over the boundary), a 4 point multiplier (hits boundary), a two point multiplier (hit clear of opponents) or no multiplier (hit towards an opponent). There might also be a weighting on the degree of accuracy with which the video-player can complete each of the potential shot selections.

6) Baseball—The batter may achieve a home run or first, second or third base run with appropriate multipliers (eg 4, 1, 2, 3, respectively). Over the fence would be a home run, and as for Cricket a catch would equal no points.

7) Other games with rules similar to soccer would include ice hockey, hockey, water polo and polo.

8) Games with local popularity such as Gaelic Football might be used in appropriate jurisdictions.

9) Novelty games might also be incorporated into some embodiments such as jousting, or roller game.

The game of the present invention may be provided as a base game on an electronic gaming machine. However it will preferably be provided as a feature game awarded to pay a jackpot or bonus prize. The game, when offered as a feature or bonus game, can be triggered by conventional combinational triggers. The trigger condition may be machine generated such as a particular number of scatter symbols appearing in the base game, or it may be system generated, such as a "Hyperlink™" trigger which is a random trigger unrelated to the game outcome of a base game being played at that time on any one of the gaming machines connected to the gaming server.

BRIEF DESCRIPTION OF THE DRAWINGS

An embodiment of the invention is now described by way of example with reference to the accompanying diagrammatic drawings in which.

DETAILED DESCRIPTION OF THE PREFERRED EMBODIMENTS

Figure 1:
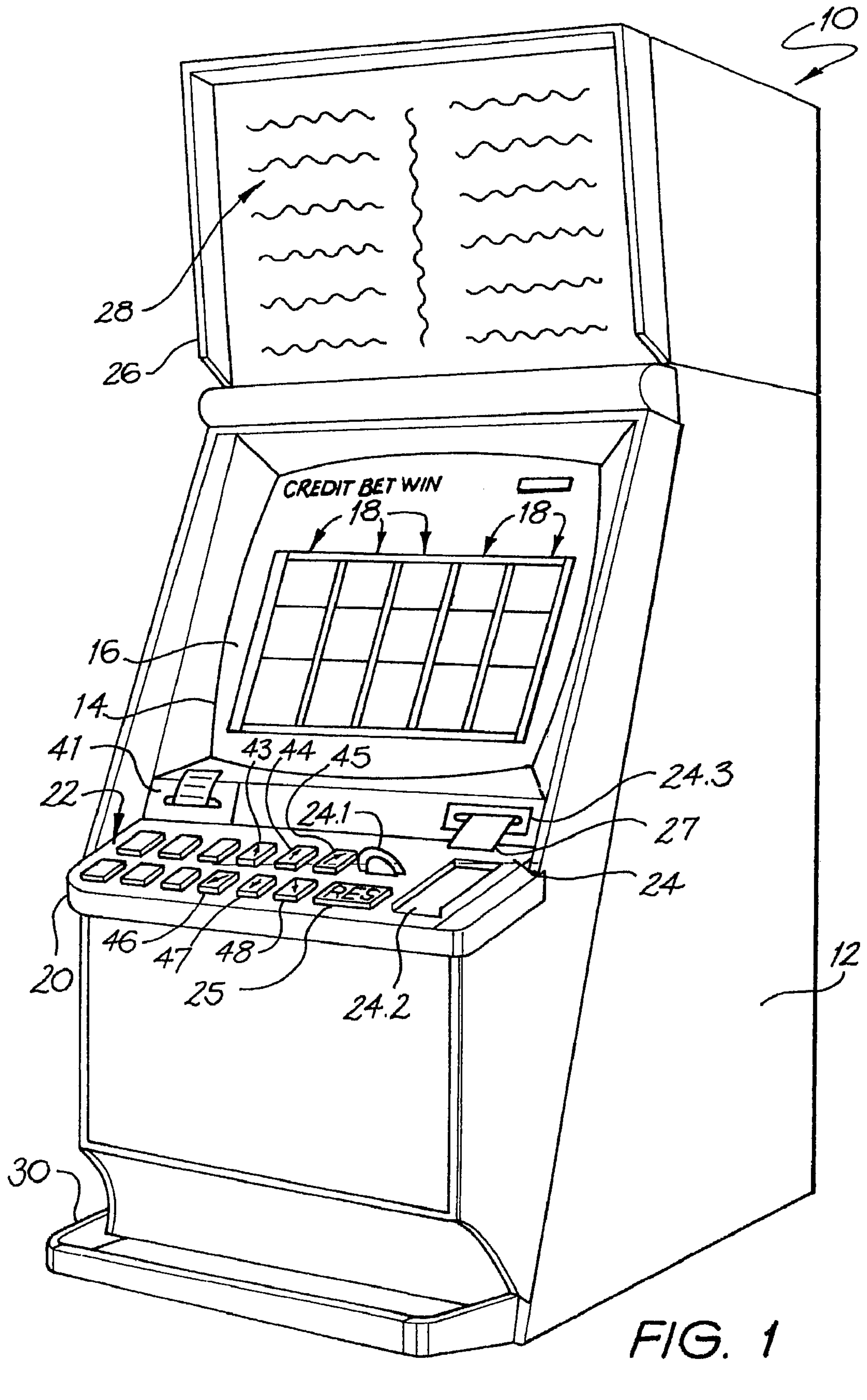
FIG. 1 shows a perspective view of a first style of gaming machine, suitable for use in systems implementing embodiments of the present invention.

Referring to FIG. 1 a typical gaming machine is illustrated of a type to which the present invention can be applied. The machine illustrated in FIG. 1 is of a type that allows credit input by insertion of coins or bills but the invention can also be applied to machines that additionally, or only, allows credit input by transfer of credit from a central cashier or from another gaming machine. In FIG. 1, reference numeral 10 generally designates a gaming machine, including a game or games to be played by a game player of the machine. The machine 10 includes a console 12 having a display in the form of a video display unit 14 on which a game 16 is played. The video display unit 14 may be implemented as a cathode ray screen device, a liquid crystal display, a plasma screen, or the like. The game 16 as illustrated in FIG. 1 is a spinning reel game which simulates the rotation of a number of spinning reels 18. However many other styles of game are also possible.

Figure 2:
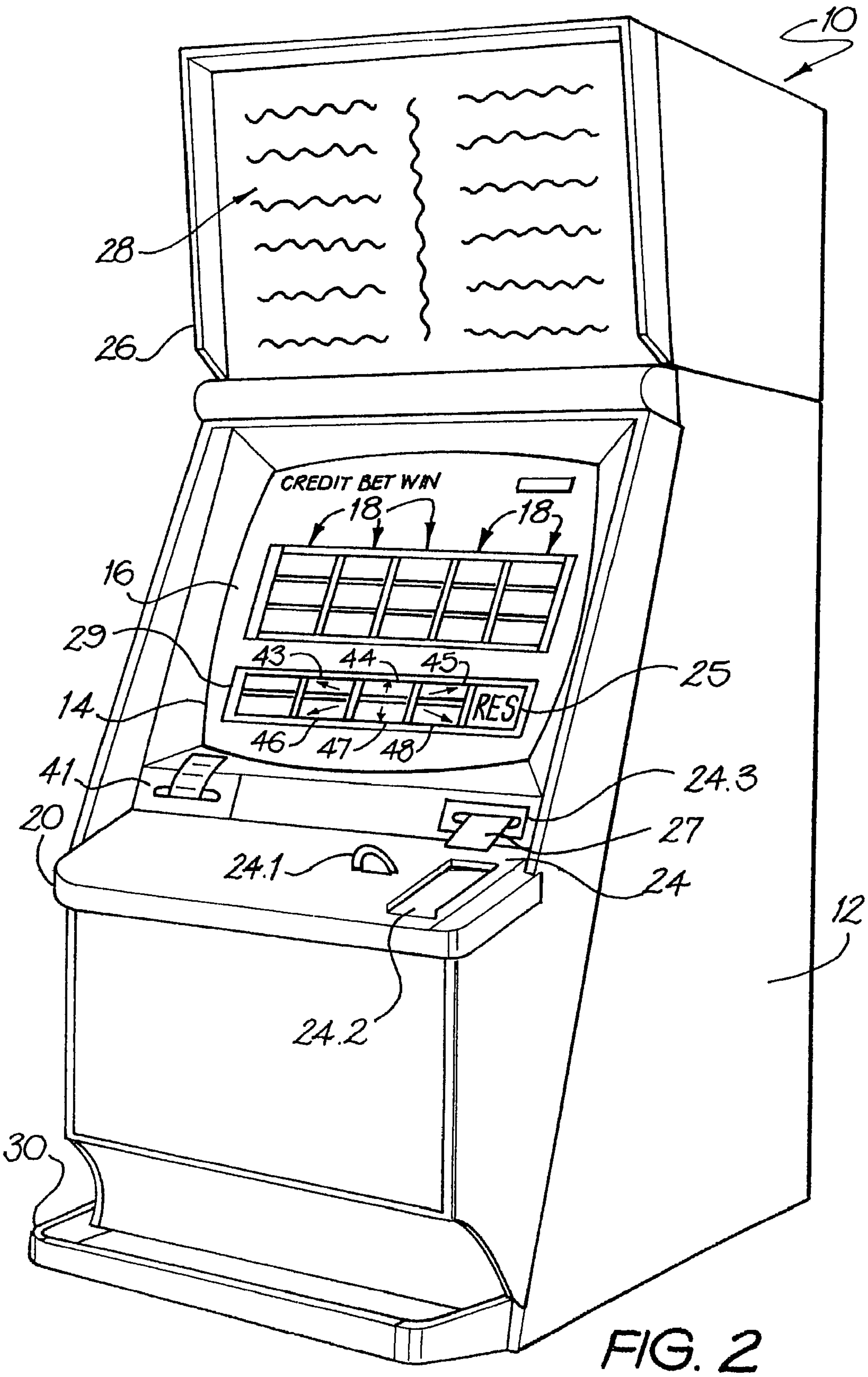
FIG. 2 shows a perspective view of a second style of gaming machine, suitable for use in systems implementing embodiments of the present invention.

A mid-trim 20 of the machine 10 optionally houses a game player input means, such as, for example, a keypad 22, for enabling a game player to play the game 16. The mid-trim 20 also houses a credit input mechanism 24 including a coin input chute 24.1 and a bill collector 24.2. As illustrated in FIG. 2, some gaming machines use a touch screen for game player input, in which case the keypad 22 may not be required. Instead the keys of the keypad 22 of the FIG. 1 machine would be represented as a graphic image 29 on the screen 16 and touch sensors 38 (refer to FIG. 3) located adjacent the screen surface detect touching of the screen 16 to record game player input. In all other respects, the machines of FIGS. 1 and 2 are essentially functionally identical.

The machine 10 of FIGS. 1 and 2 includes a top box 26 on which artwork 28 is carried. The artwork 28 includes paytables, details of bonus awards, etc. The artwork 28 in the top box 26 may optionally be displayed on a video display such as a CRT or LCD panel.

A coin tray 30 is mounted beneath the console 12 for cash payouts from the machine 10.

Figure 3:
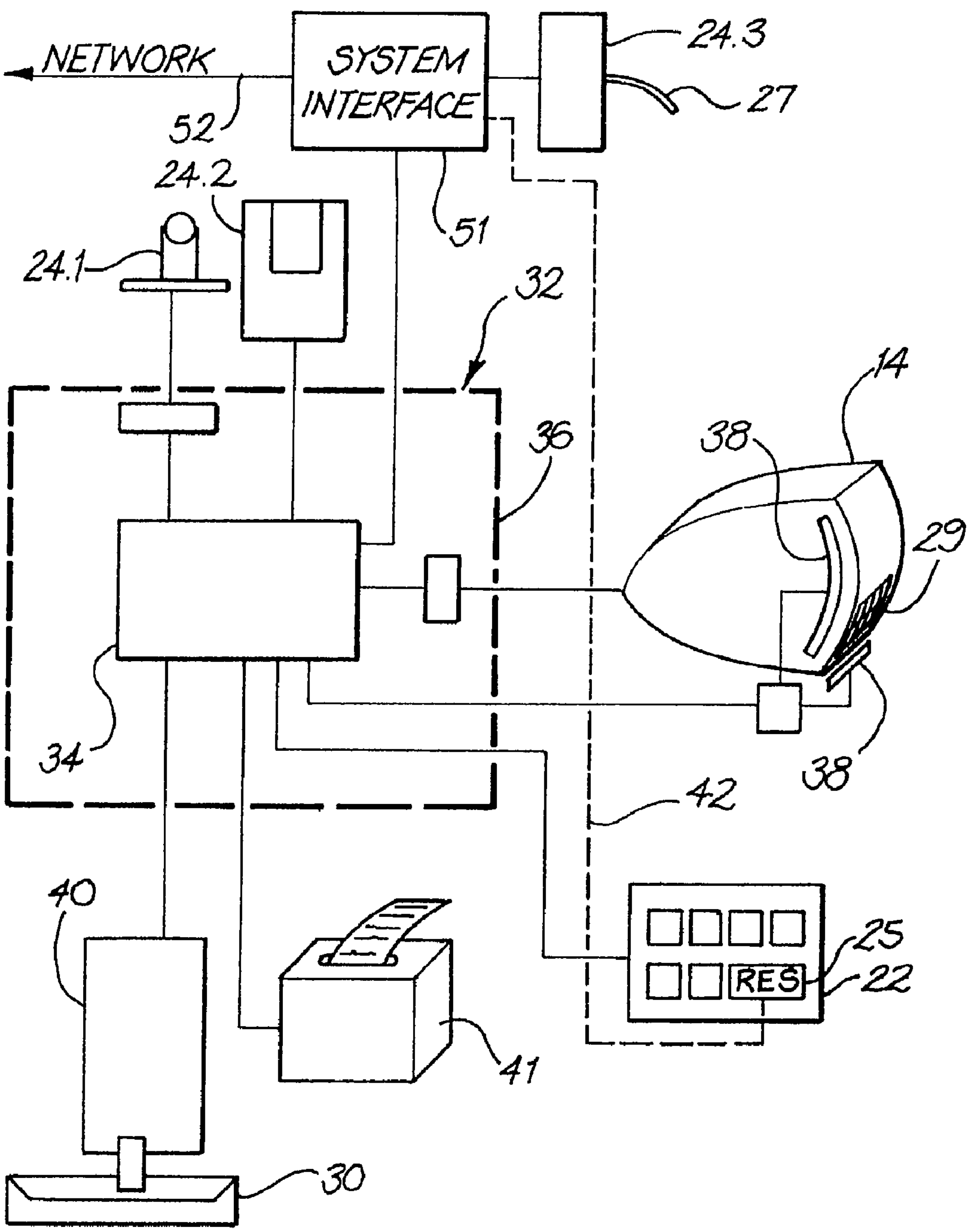
FIG. 3 shows a block diagram of a control circuit of the gaming machines of FIGS. 1 and 2.

Referring to FIG. 3 of the drawings, a control circuit 32 of the gaming machine 10 is illustrated. A program which implements the game and game player interface is run on a processor 34 of the control circuit 32. The processor 34 forms part of a controller 36 that drives the screen of the video display unit 14 and that receives input signals from game player inputs such as the optional keypad 22 (see FIG. 1) or the optional sensors 38 associated with the pseudo-keypad 29 (see FIG. 2). The sensors 38, if used, include touch sensors mounted in the screen of the video display unit 14 and are associated with the representation of pseudo-buttons of the keypad 29, displayed on the display 16, thereby replicating the buttons of the keypad 22. The controller 36 also receives input pulses from the mechanism 24 to determine whether or not a game player has provided sufficient credit to commence playing. The credit input mechanism 24 may comprise one or more of several credit input devices such as the coin input chute 24.1, the bill collector 24.2, and a card reader 24.3 or any suitable other type of validation device. In some embodiments of the present invention, there may be a game player tracking input device, such as the card reader 24.3, that can be used to associate a particular game player with a particular game player profile and, optionally, a credit held in a system 100, as described in greater detail below. Game player tracking does not require knowing the actual identity of the game player but is only used to associate the game player with a particular game player profile and/or credit. This is achieved in the preferred embodiment by using a game player tracking card 27 which is a simple magnetic stripe card encoded with a unique code that is issued to the game player either when the game player enters the establishment or when the game player establishes a credit in the system and is read by the card reader 24.3. However other methods of game player identification can be employed in tracking systems such as PIN's, scannable tags of various known types such as magnetic stripe cards, smart cards, etc, iris recognition, finger prints or other bio-sensor systems.

Finally, the controller 36 optionally drives a payout mechanism which, for example, may be ticket printer 41 or a coin hopper 40 for feeding coins to the coin tray 30 to make a pay out to a game player when the game player wishes to redeem his or her credit. Again, however, in embodiments of the present invention, a payout mechanism is not essential as the game player may remove the credit held in the machine by transferring it to another machine or to a cashier.

Figure 4:
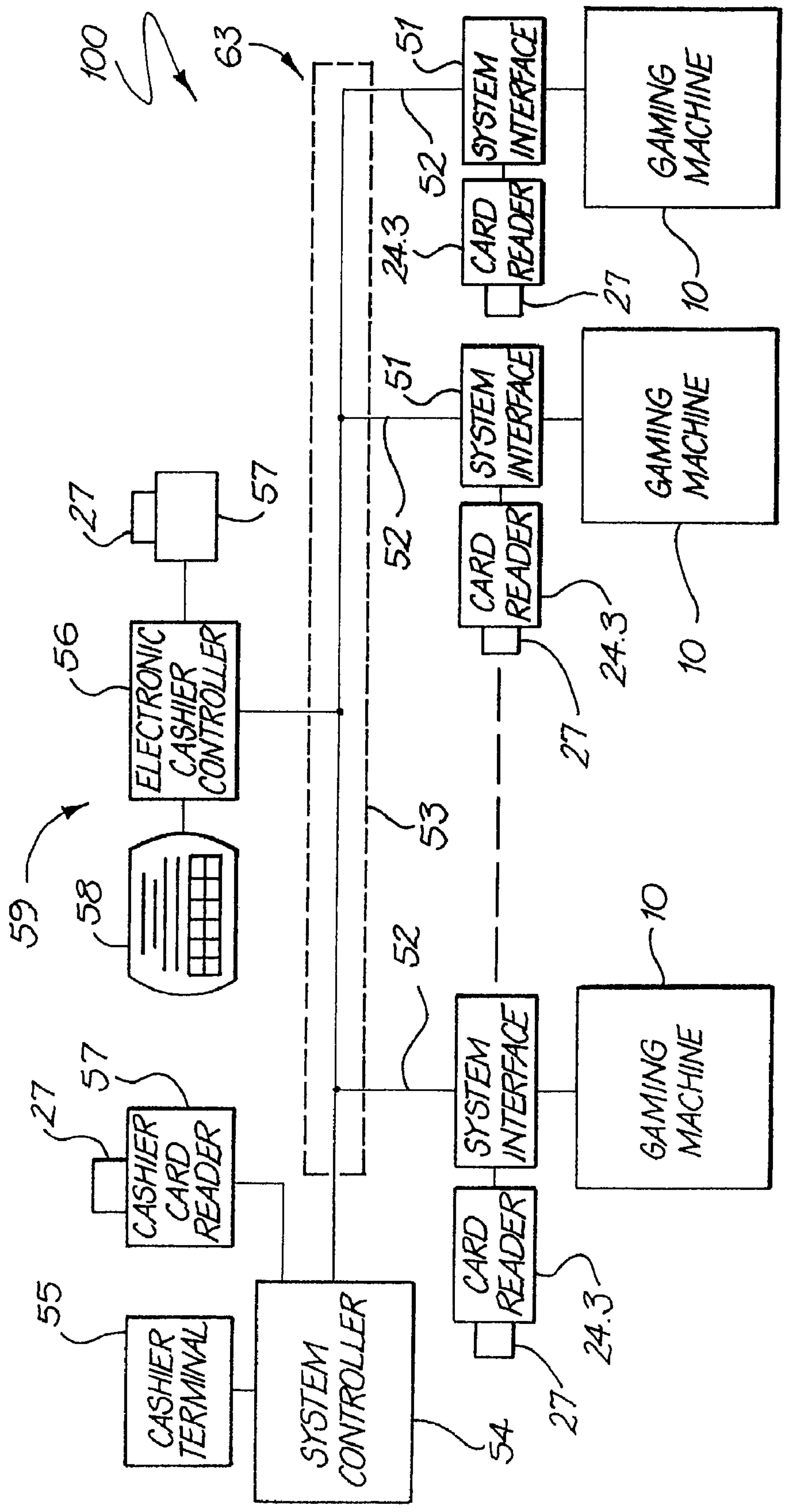
FIG. 4 shows a block diagram of a system implementing an embodiment of the present invention.

In an embodiment of the present invention, a plurality of the machines 10 form part of a gaming system 100 (FIG. 4) and are linked via a computer network 63 to a gaming server or system controller 54 which controls the network 63. Each gaming machine is connected to the network 63 by a system interface 51 and network connection 52. The network connections 52 are preferably connected to the remainder of the network 63 via a hub 53 although other networking architectures such as daisy chaining may also be employed. A cashier's station 55 is optionally connected, either to the system controller 54 directly, as illustrated in FIG. 4, or alternatively via the network hub 53. The cashier's terminal may be replaced, or supplemented, by an electronic cashier's terminal or cash in/cash out terminal 59 comprising a controller 56 to which is connected a game player controlled touch screen 58 and a card reader 57. The electronic cashier's terminal 59 uses EFT transactions to debit or credit a game player's account at a financial institution to establish or refund a game player's credit in the gaming system 100.

Game player profiles are saved on the system controller 54 and credits can be applied to and cleared from the machines 10 via the network 63. The credits can either be established at the cashier's station 55 or the terminal 59 and transferred to the machine 10 or, instead, a game player might already have credits in another machine 10 in the network 63 and which the game player may wish to transfer to a new machine that he or she wishes to play.

To facilitate the establishment and use of game player profiles to enhance game player enjoyment and to enable the secure transfer of cash to a machine 10, each machine 10 is provided with the card reader 24.3 and the game player is issued with a game player tracking card 27 either when entering the premises or when establishing credit in the system. This tracking card 27 is inserted into the card reader 24.3 of a machine 10 by the game player after the game player has established a credit on the system 100 and has had the credit transferred to the desired machine 10. Alternatively, the card 27 is a membership card permanently in the possession of the game player and the game player establishes a credit in an account associated with the game player's membership record. By inserting the card 27 into the card reader 24.3 of the machine he or she intends to play, the game player identifies himself or herself to the machine 10 and establishes that a credit held in the system 100 belongs to the game player. In the illustrated embodiment, the card reader 24.3 is not connected directly to the machine's controller 36 but to the system interface 51 which is connected to the network 63 via interconnection 52.

While embodiments of the invention will be described by way of example in the context of the gaming machine 10 and the gaming system 100 described above, it will be recognised that the invention is equally applicable to other game playing apparatus and environments such as internet gaming where games are played on a personal computer connected to an internet gaming website, on a hand held device such as a Personal Digital Assistant (PDA) or Mobile Phone, on a stand alone hand held device or, any other suitable gaming environment.

The present invention relates particularly to a new game type, an example of which is described below. The game of the invention can be provided as a main game of the gaming machine 10. However, in the example described below, the game is provided as a bonus game which is triggered by a random trigger unrelated to the outcome of a current base game. The random triggering mechanism of the preferred embodiment is known as the "Hyperlink™" system and is described in Accepted Australian Patent Application No 754689 incorporated herein by reference. The advantage of the "Hyperlink™" system is that the trigger is applicable with any base game and allows progressive jackpot systems to be implemented on networks to which machines of different denominations are connected. In the illustrated example, the bonus game relates to a soccer tournament and has a soccer theme. The bonus game is an interactive game where the game player is afforded the opportunity to have a series of video-players of a soccer team take kicks at goal with each kick being worth a predetermined number of points as will be described in greater detail below.

Figure 5:
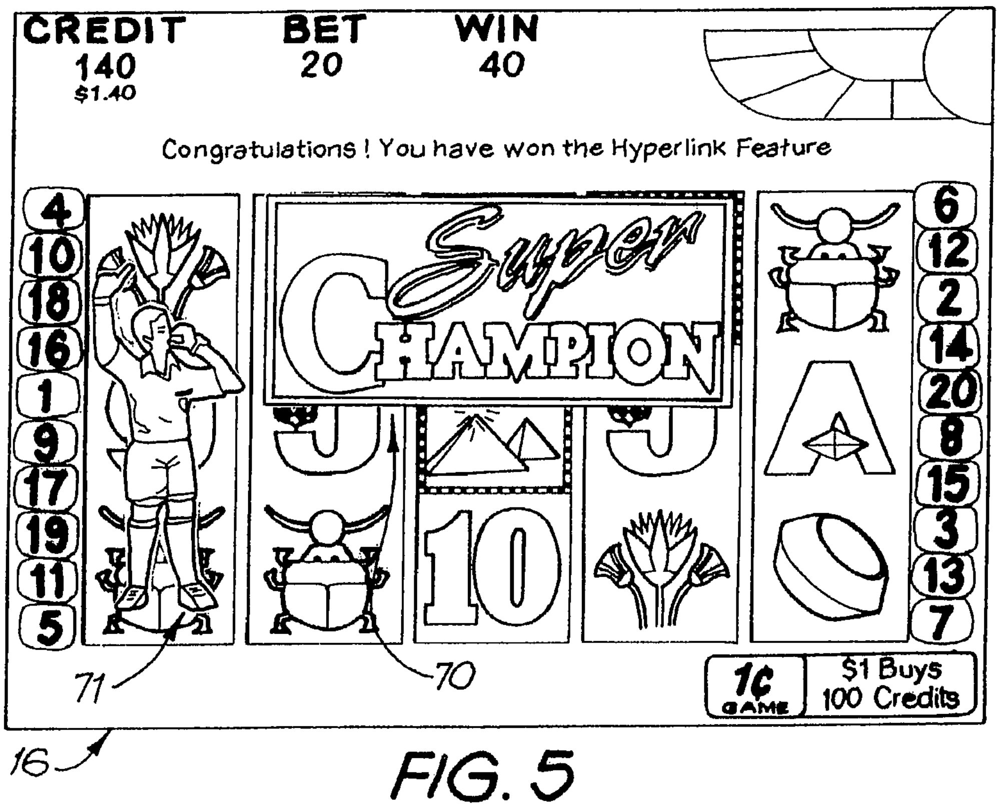
FIGS. 5 to 32 show screen images at various stages in the play of a game embodying the present invention.
Figure 6:
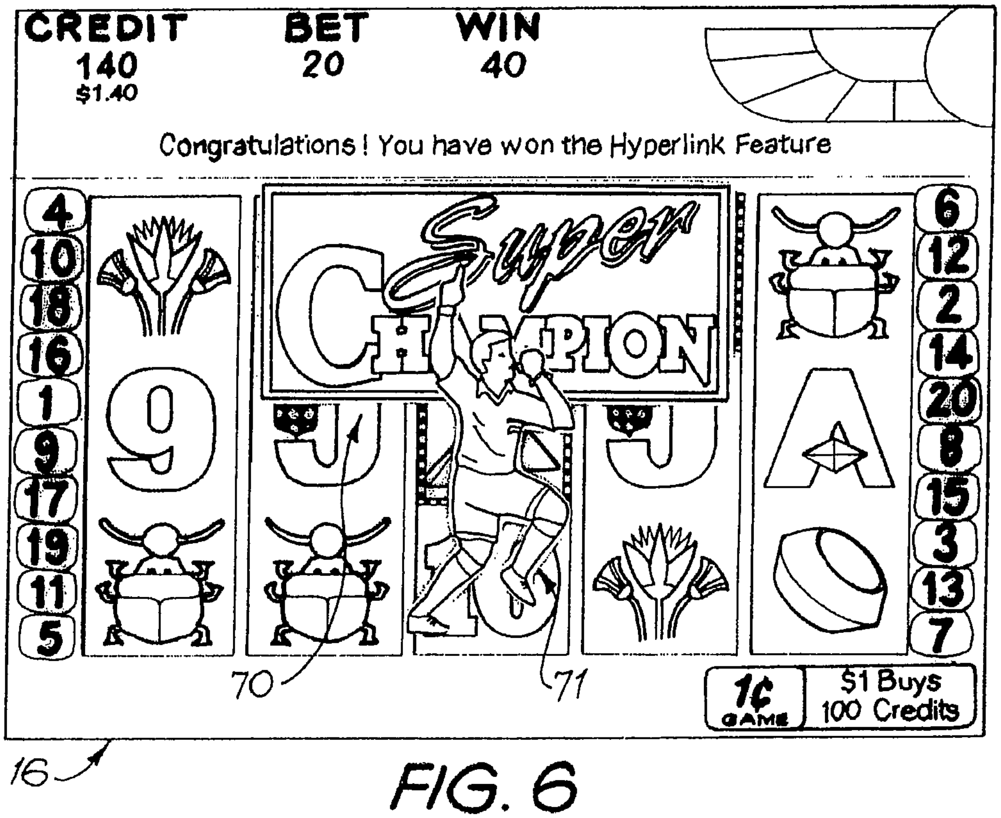

In the present example, the base game is a relatively standard pseudo spinning-reel video game, for which a part of a base game screen is illustrated in FIG. 5. The base game is essentially a standard spinning reel game, does not form part of the invention and will not be described in detail here. The occurrence of a triggering event for a bonus game is indicated by a banner 70 which pops up at the end of an instance of the base game to signal the imminent commencement of a bonus game. After the banner 70 appears, a referee 71 appears running across the screen, as illustrated in FIG. 6. This serves to further draw the game player's attention to the imminent commencement of the bonus game.

Figure 7:
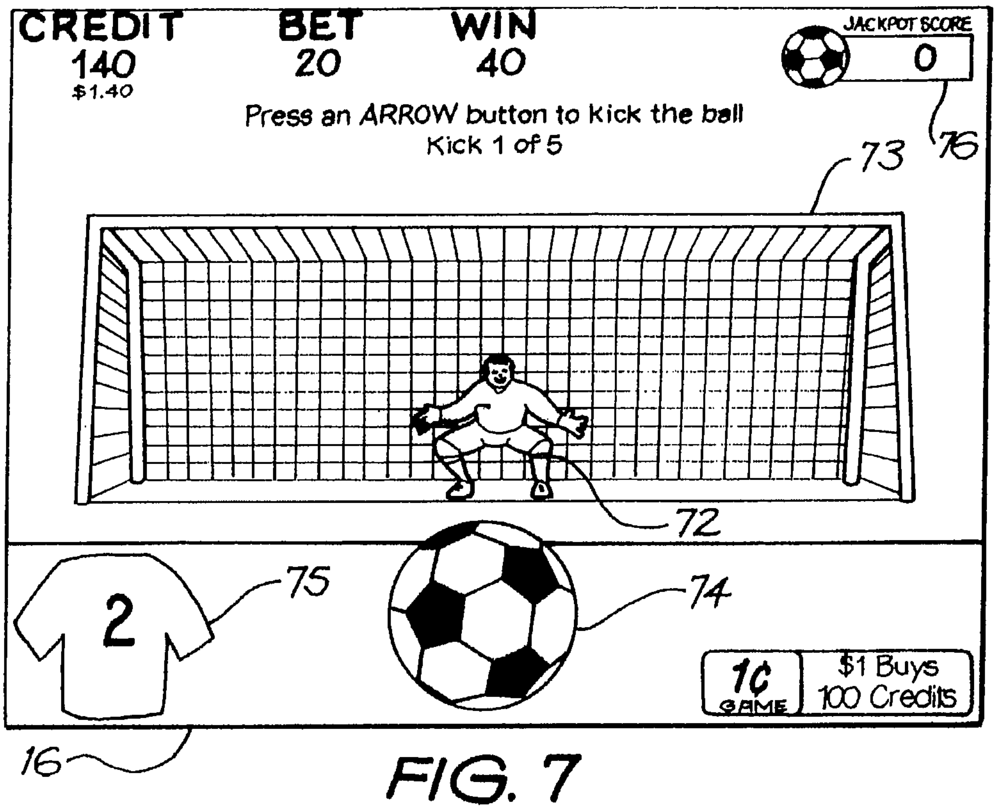

The bonus game comprises a series of game play sequences as illustrated in FIGS. 7 to 28. Referring to FIG. 7, the game player is presented with an image of a video-player of an opposing soccer team. More particularly, the video-player is a goalkeeper, or "goalie", 72 who is depicted in front of a set of goal posts 73, with a ball 74 placed ready for kicking.

Figure 8:
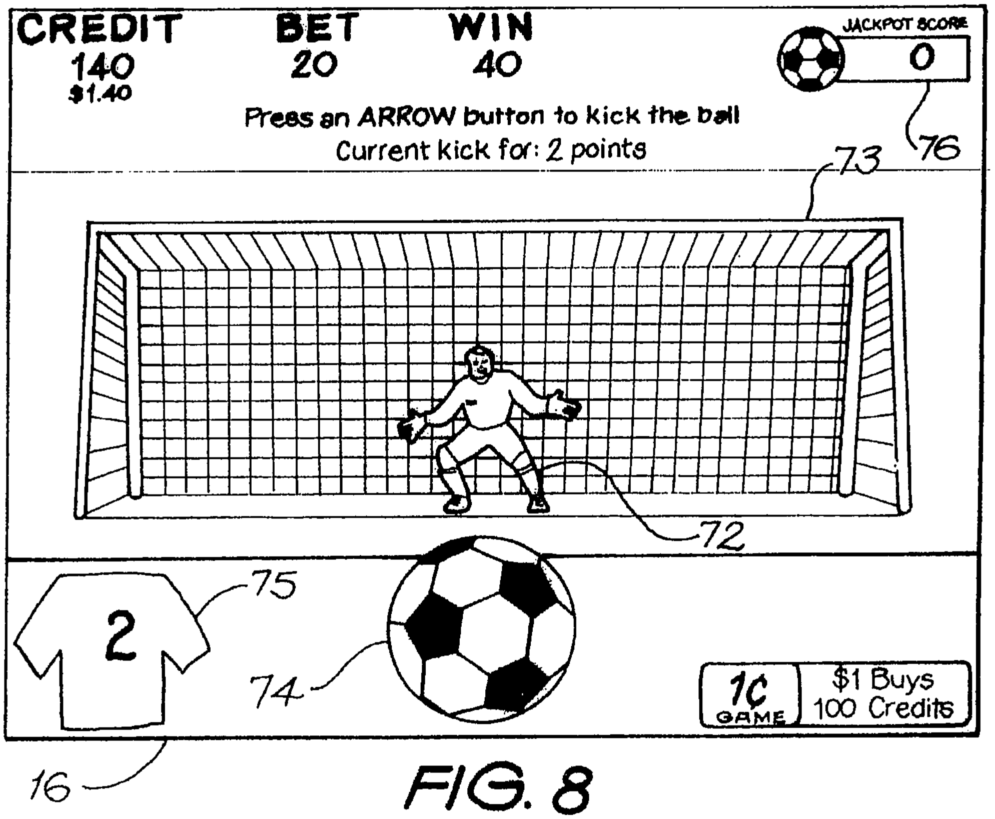

In a first sequence of the bonus game, a first video-player of the game player's team is randomly selected by the game controller 36 of the gaming machine 10 to take a kick at goal. The video-player selected by the game controller 36 is depicted on the display by way of that video-player's shirt 75. The number appearing on the shirt 75 is representative of the number of points to be awarded to the game player if a successful outcome results, i.e. if a goal is scored. In this case, the game controller 36 has selected a video-player whose shirt 75 has the numeral 2 on its back indicating that video-player number 2 in the team will take the shot at goal. As shown in FIG. 8 of the drawings, a message appears advising the game player that the current action, if successful, will have a points value of 2. The message further advises the game player that the game player must select one of six buttons (43, 44, 45, 46, 47 & 48 in FIGS. 1 & 2) of the keypad 22 or the graphic image 29, as the case may be, to indicate the direction in which the video-player is to kick the ball. The six directions corresponding to the six buttons are the top left, centre or right, or bottom left, centre or right of the goal.

Figure 9:
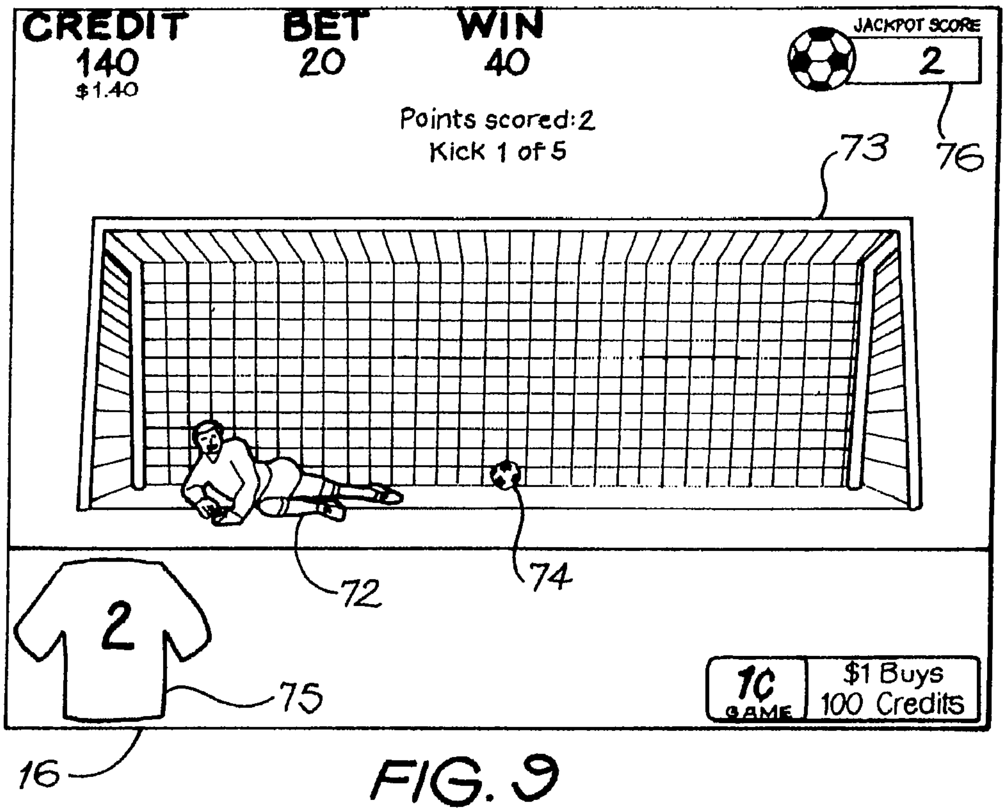

When the game player makes a selection by pressing one of the six buttons, an animation of the ball flying through the air is played to indicate that the ball has been kicked. As shown in FIG. 9 of the drawings, the ball 74 is seen in the goal area behind the posts after the kick with the goalie 72 on the ground having failed to save the goal resulting in a successful outcome for the game player. A score of two points is added to a jackpot score meter 76.

In this embodiment, the game player has a 58% chance of scoring a goal in each of the game sequences and a random number generator of the game controller 36 decides whether the game player will be successful or not. The game player's selection of the direction in which the kick is to be taken selects the video sequence illustrating the trajectory of travel of the ball towards the goal and, once the game player has selected a direction, the game controller 36 randomly decides, with a 58% weighting towards the game player, whether or not the goalie 72 will save the goal. In the case of a determination that an unsuccessful outcome is to result, the game controller 36 then selects a sequence randomly from two possible sequences, one being that the goalie 72 dives in the correct direction and punches the ball away and the other being that the goalie 72 dives in the correct direction and catches the ball. In the case where the video-player scores a goal, the machine chooses a direction other than the direction chosen by the game player for the goalie 72 to dive and plays an animation of the goalie 72 diving away from the ball.

Figure 10:
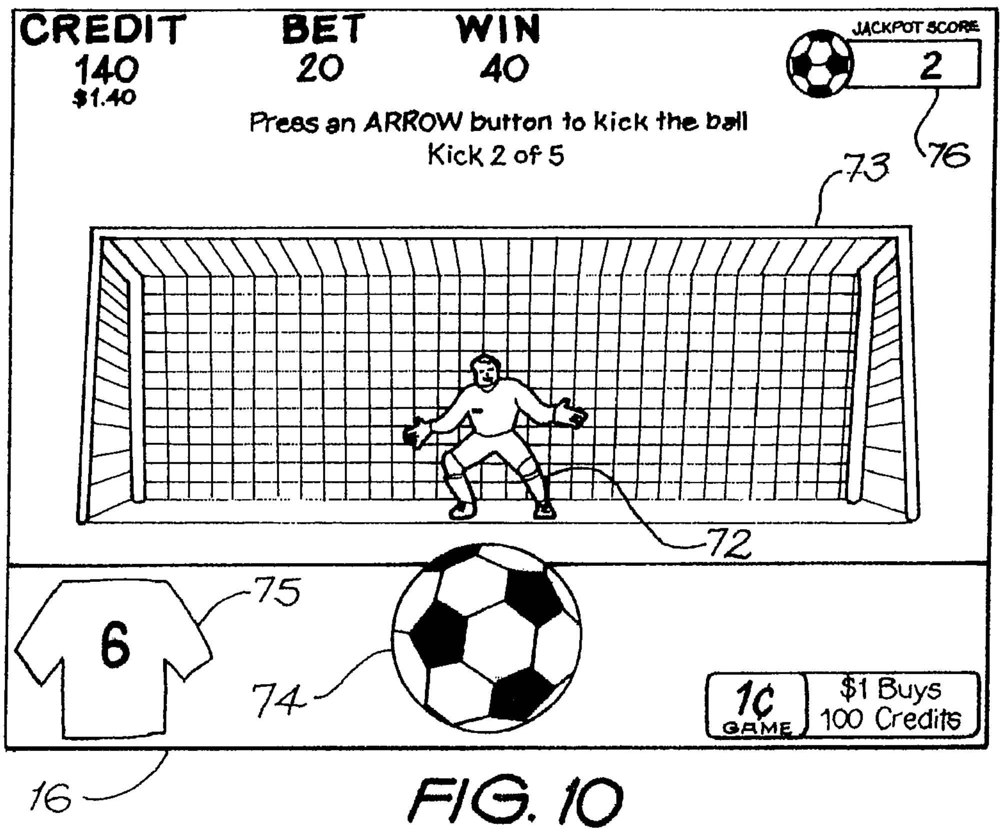
Figure 11:
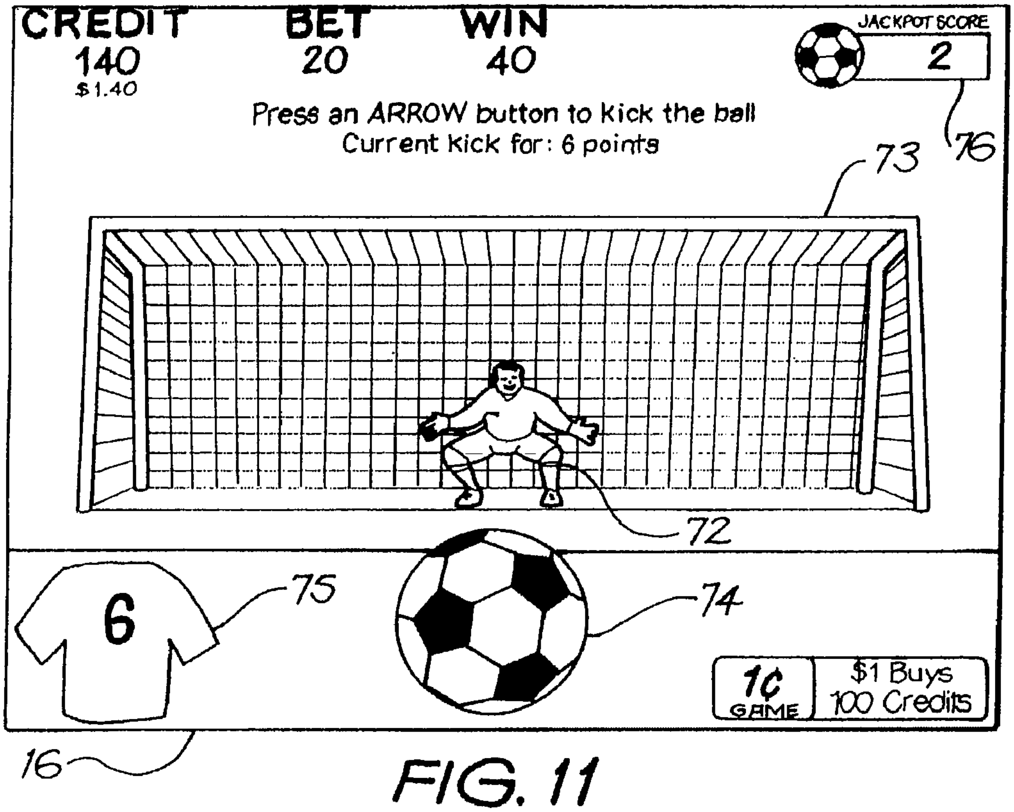
Figure 12:
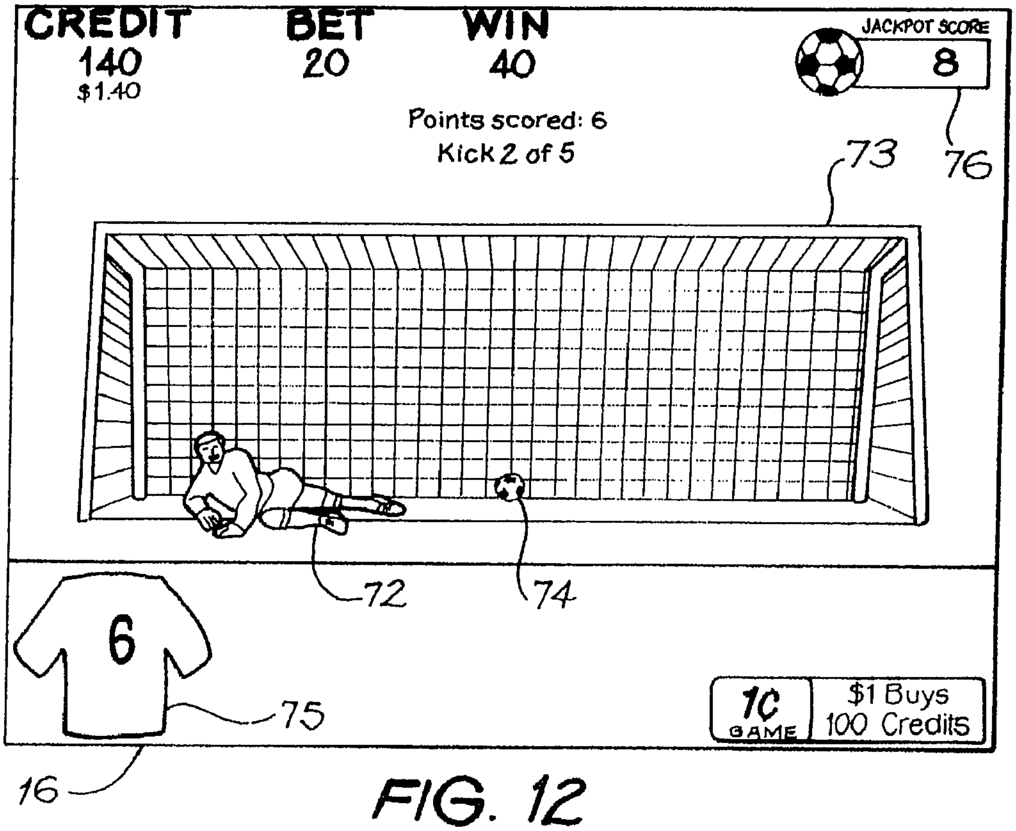
Figure 13:
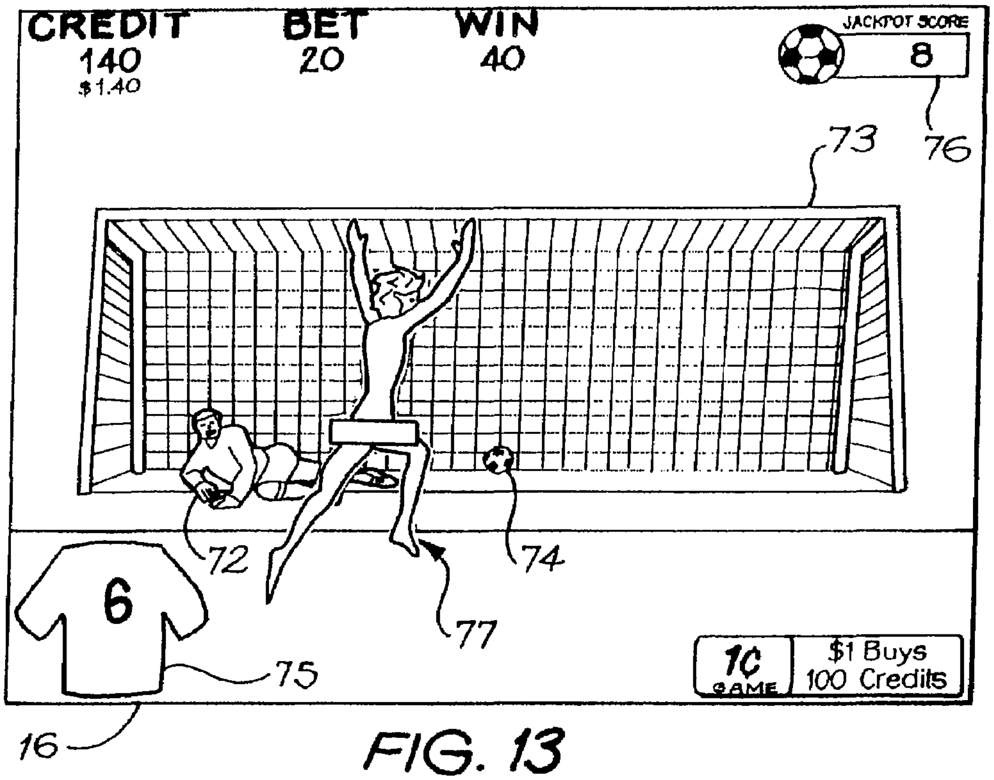

Once the first sequence of the bonus game has been completed as seen in FIGS. 7, 8 & 9, a second sequence commences as illustrated in FIGS. 10, 11 & 12. In this instance the sequence is identical except that the shirt 75 of the video-player randomly selected by the game controller 36 carries the number 6 and hence the points being played for are 6. It is to be noted that the selection of the number on the video-player's shirt 75 is made without replacement, i.e. the number on the shirt in any bonus game is not repeated except in the case of a free kick, described in greater detail below.

As illustrated in FIG. 12, the game player in the second sequence has scored a goal and has been awarded a further 6 points giving a total of 8 points as shown on the jackpot score meter 76.

Figure 14:
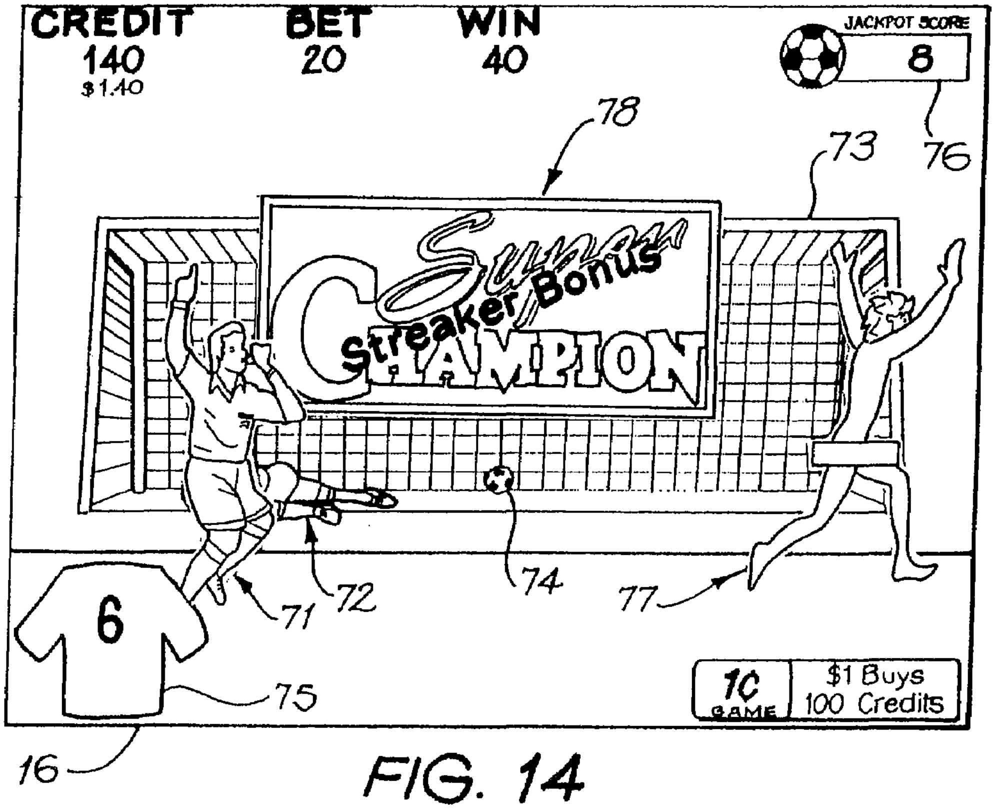
Figure 15:
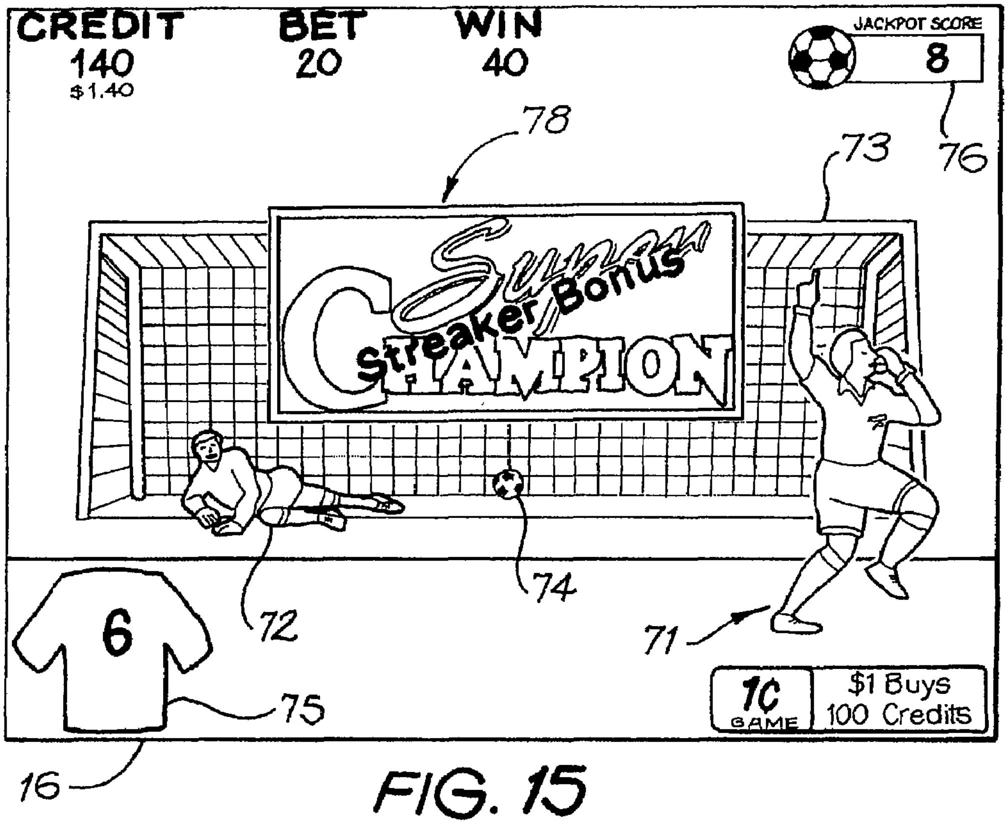
Figure 16:
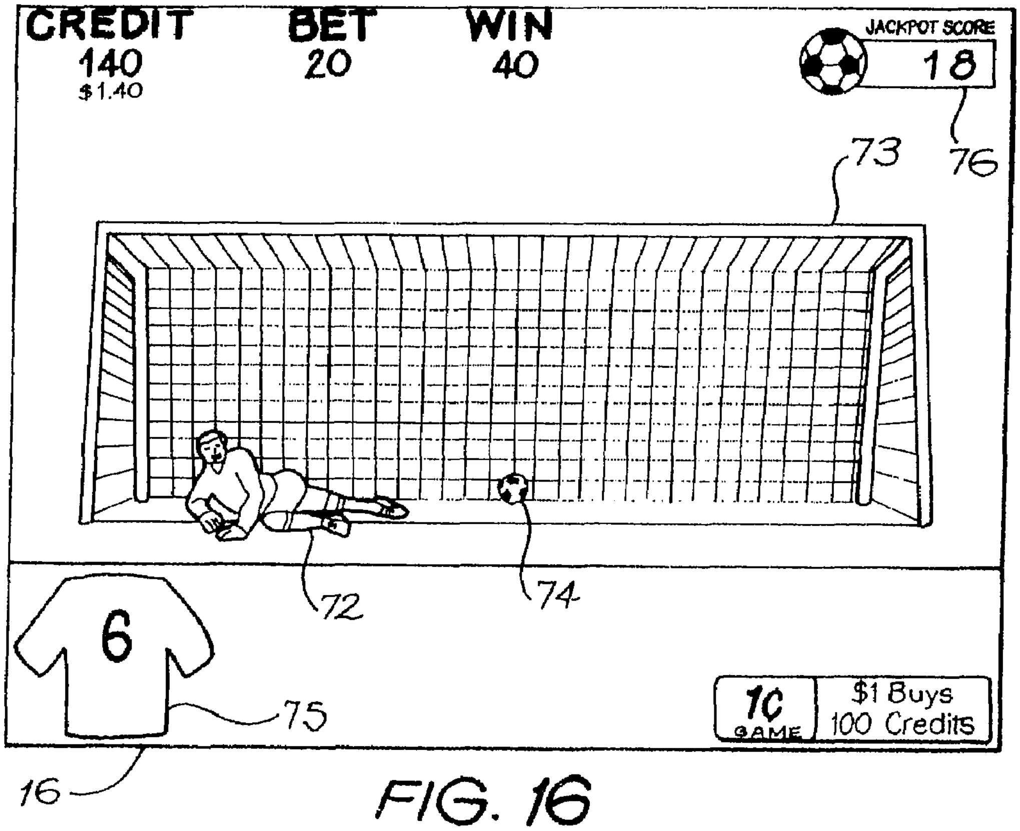

There are several additional random bonus features provided in this embodiment of the game, one of which is the appearance of a streaker 77 (FIG. 13) running across the screen followed, as shown in FIG. 14, by the referee 71 blowing his whistle and the appearance of a banner 78 indicating that an extra bonus has been won. In this instance a streaker bonus is worth 10 points and after the referee 71 progresses off the screen, as shown in FIG. 15, the extra bonus score is added to the jackpot score meter 76 as illustrated in FIG. 16. The screen display is, apart from the change to the amount on the jackpot score meter 76, the same as it was prior to the occurrence of the streaker 71. It should be noted that while the streaker bonus sequence has been illustrated here as occurring after the second game sequence of the game, it is randomly generated and may not occur in every instance of the game. When it does occur, it will occur at a random time. In effect, there is a fixed 5% probability of the streaker bonus occurring at the end of each game sequence of the bonus game.

Figure 17:
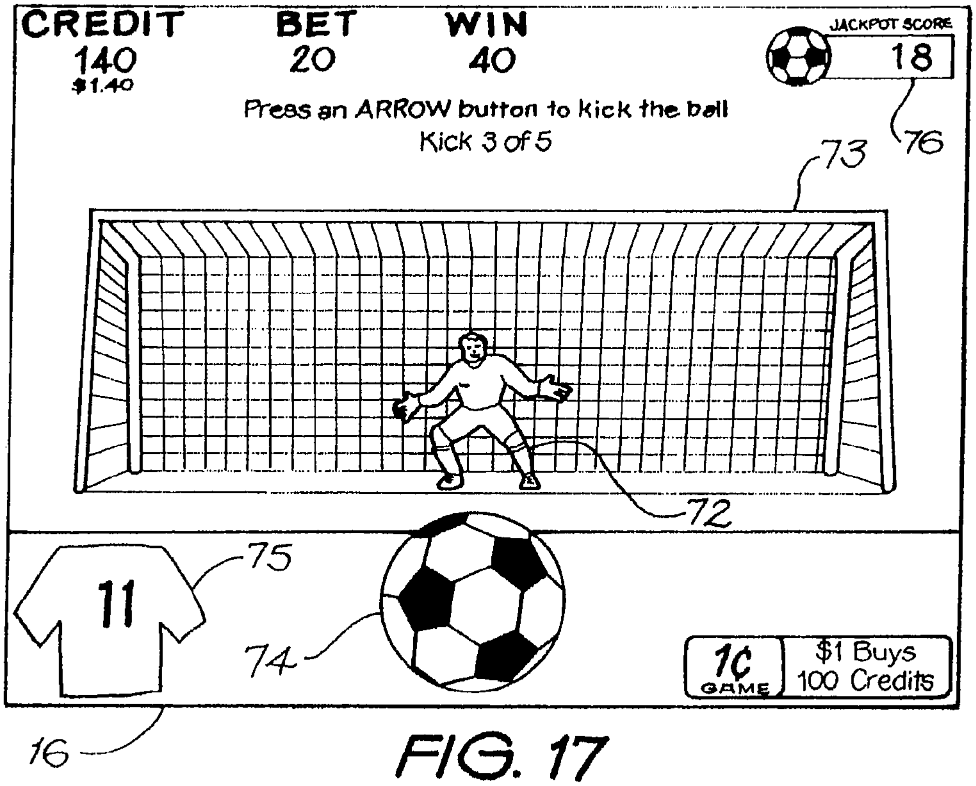
Figure 18:
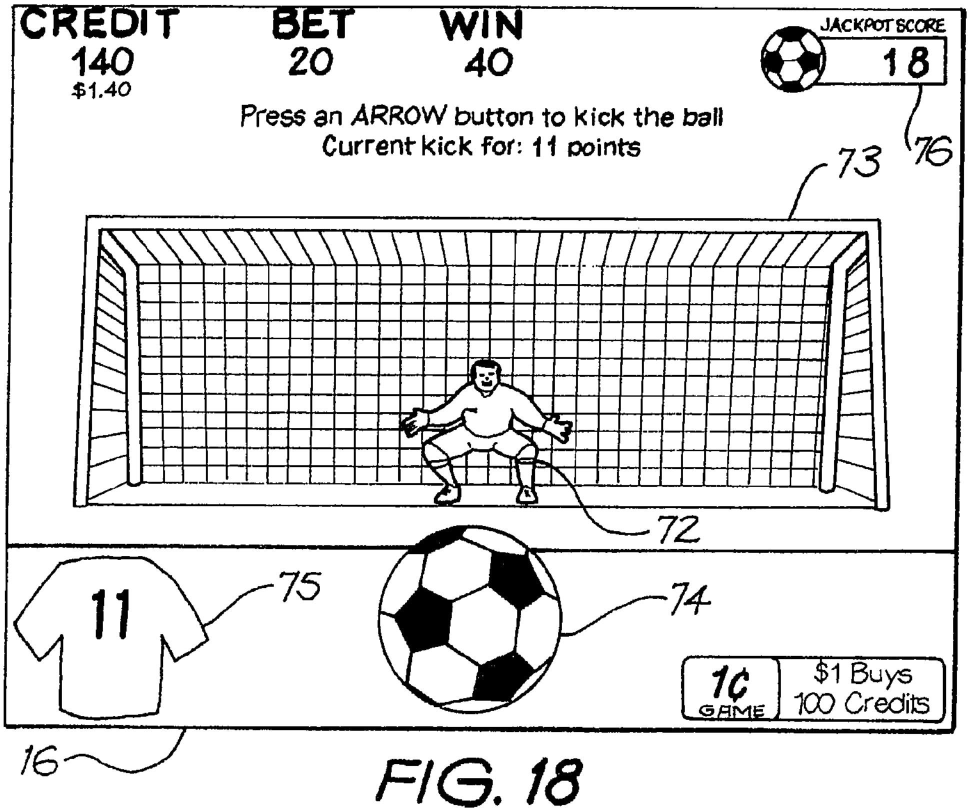
Figure 19:
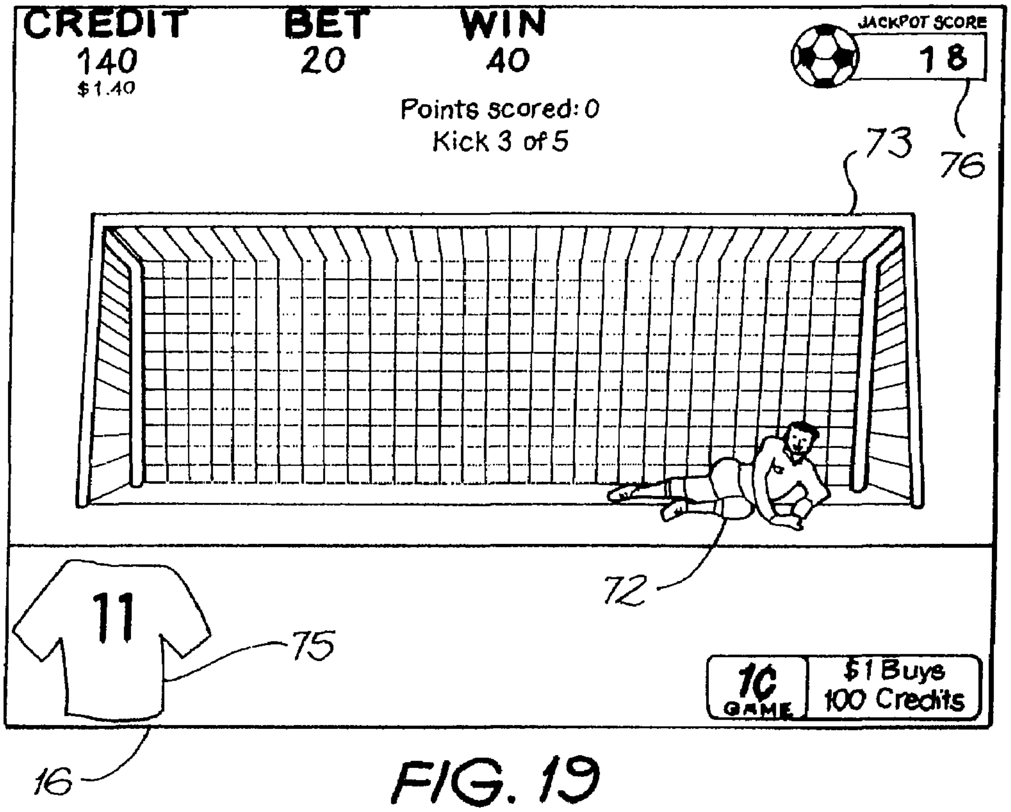

The third sequence of the bonus game is illustrated in FIGS. 17, 18 & 19, in which a video-player with a shirt 75 carrying the number 11 takes a shot at goal. As indicated in FIG. 19, the game player has been unsuccessful as the goalie 72 has saved a goal being scored by punching the ball away. As a result, no bonus points are awarded.

Figure 20:
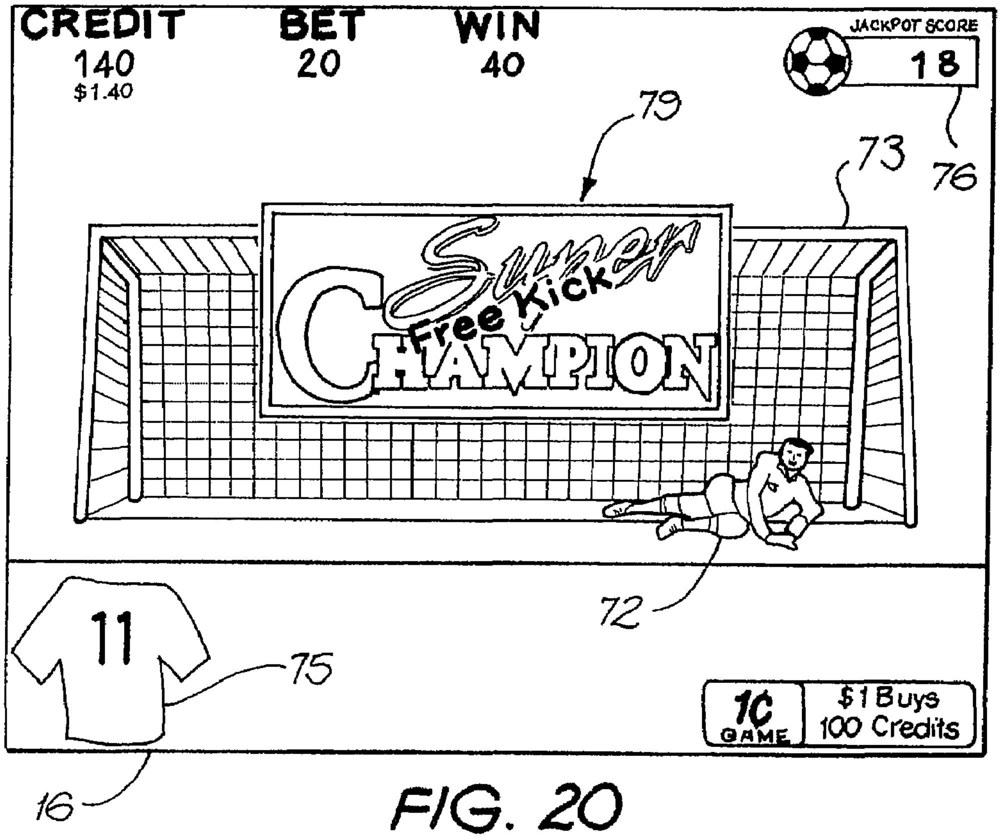
Figure 21:
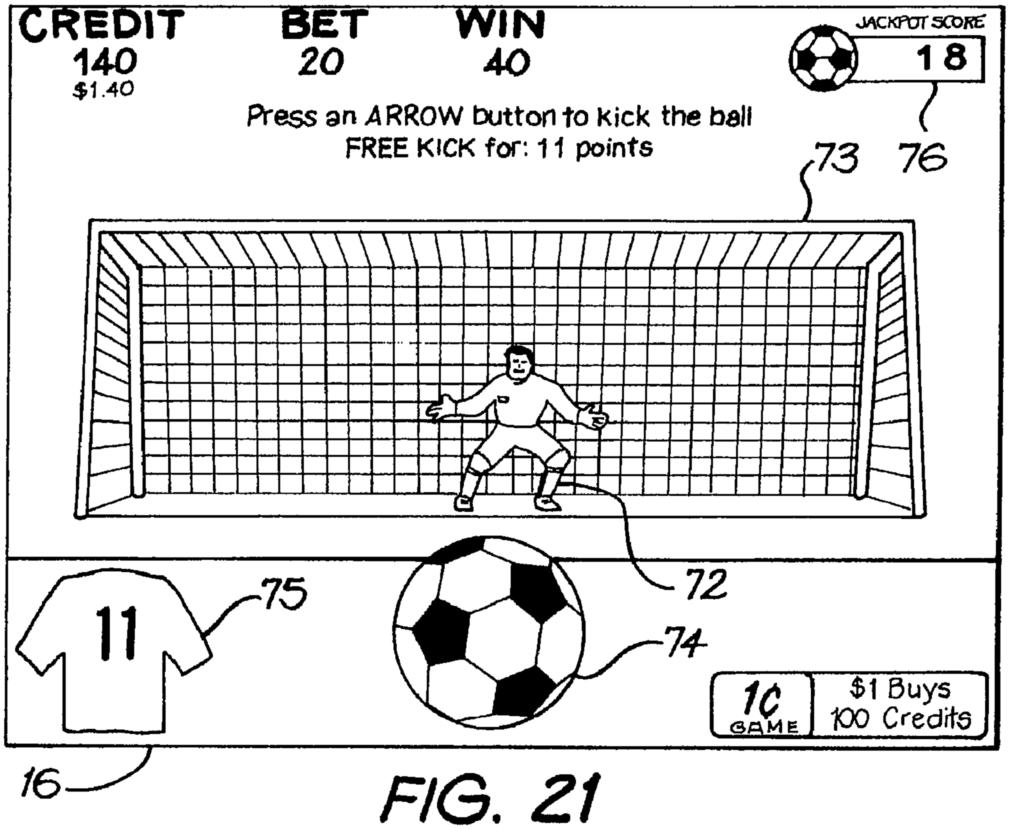
Figure 22:
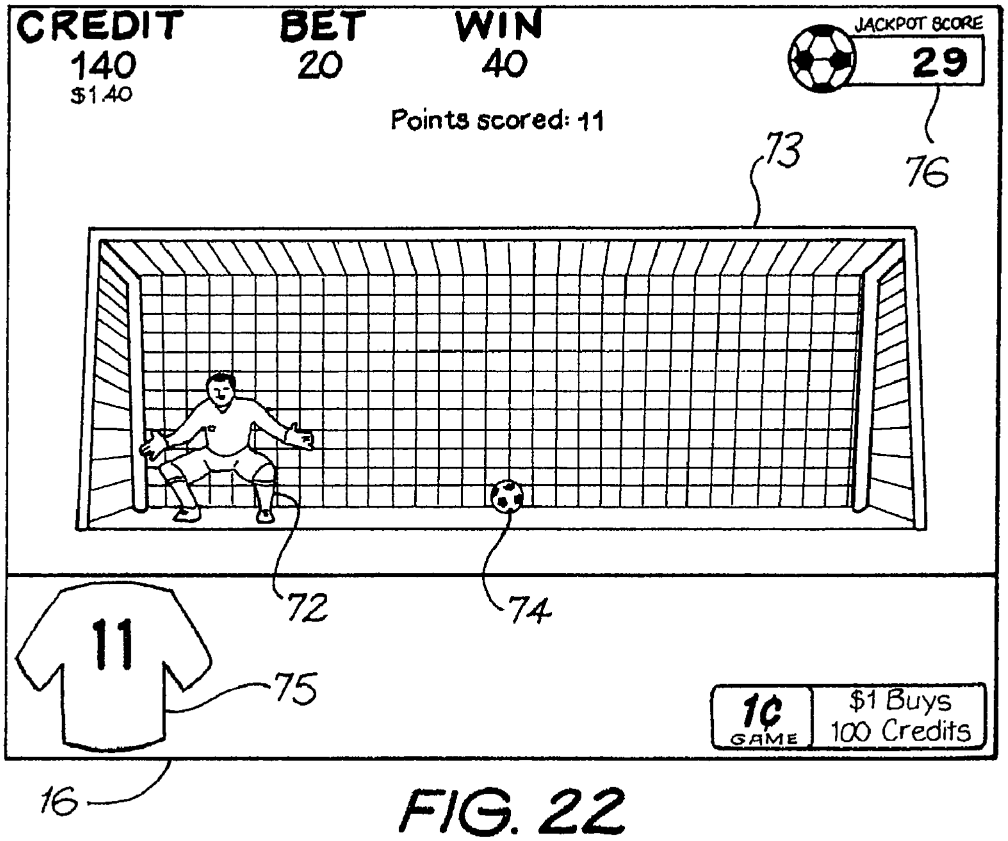
Figure 23:
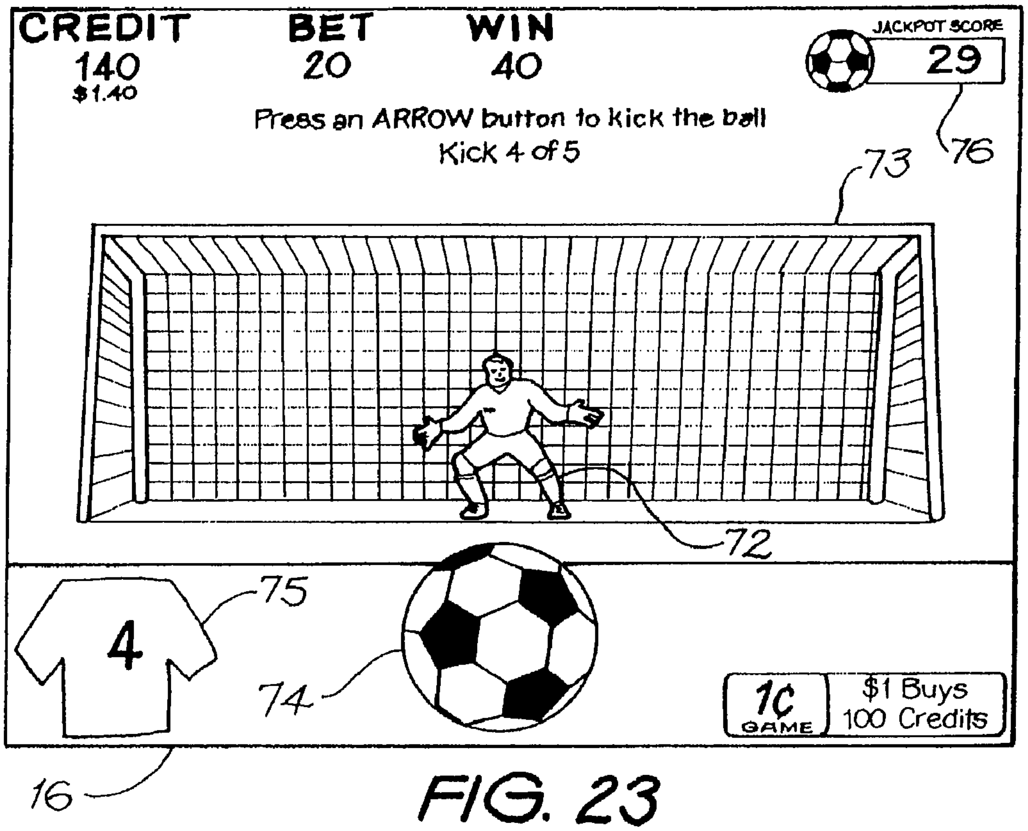
Figure 24:
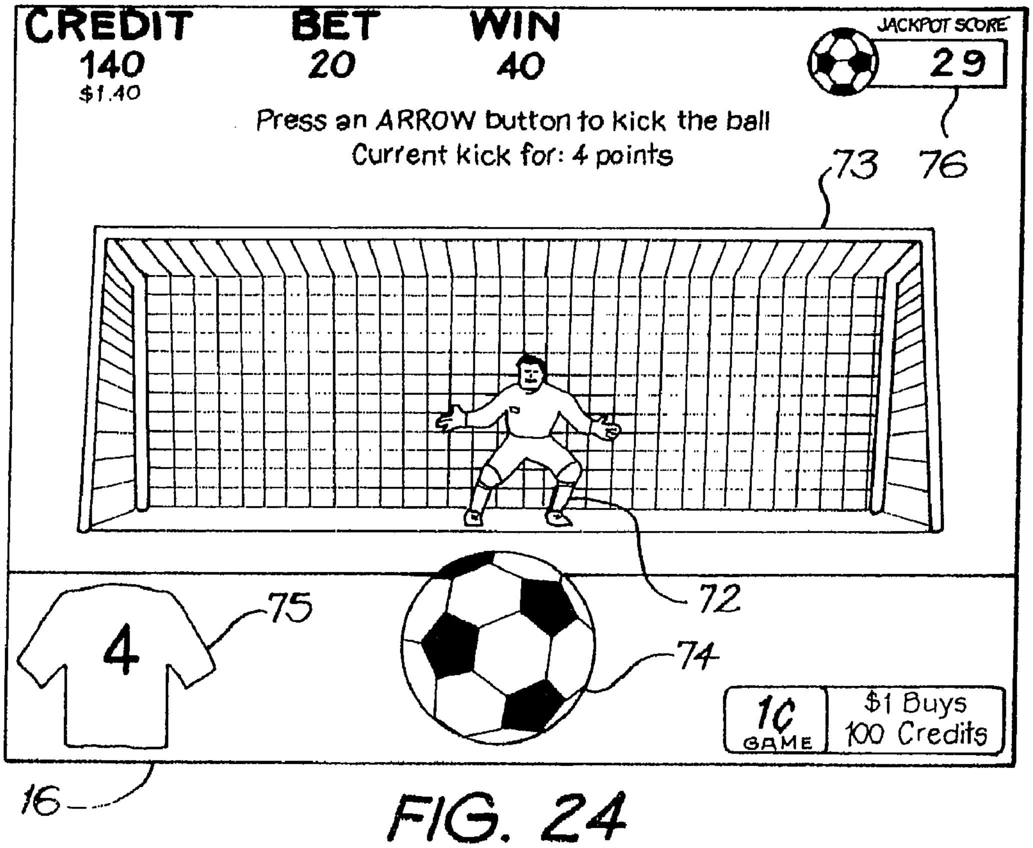
Figure 25:
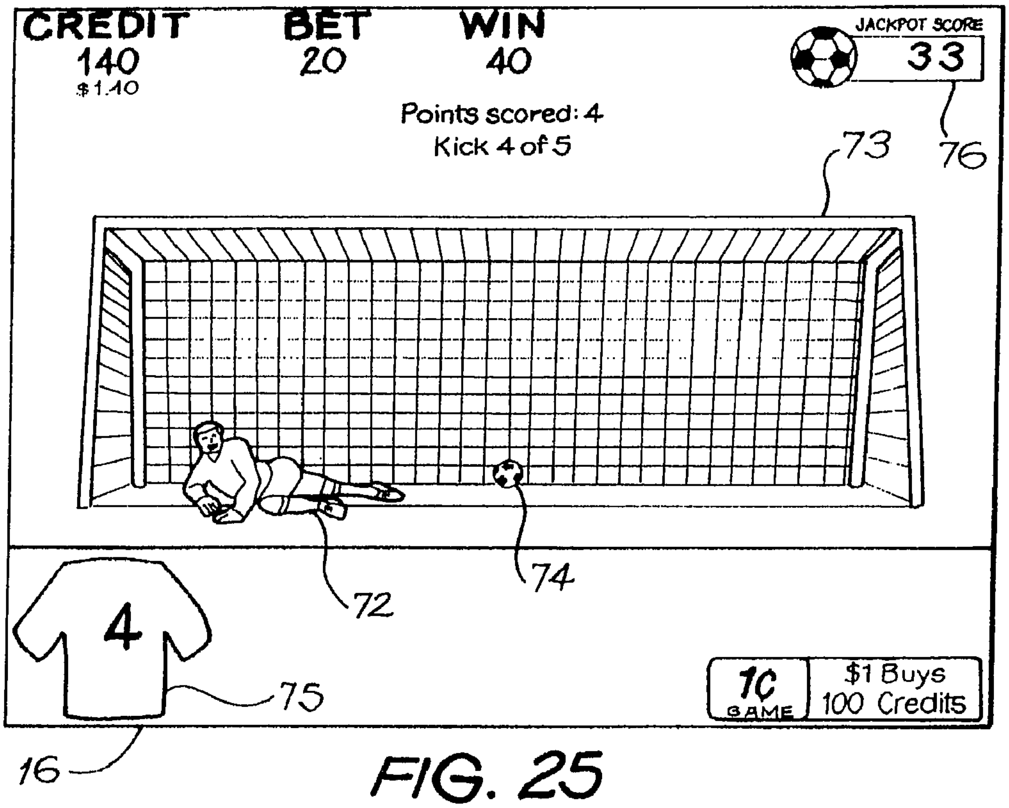
Figure 26:
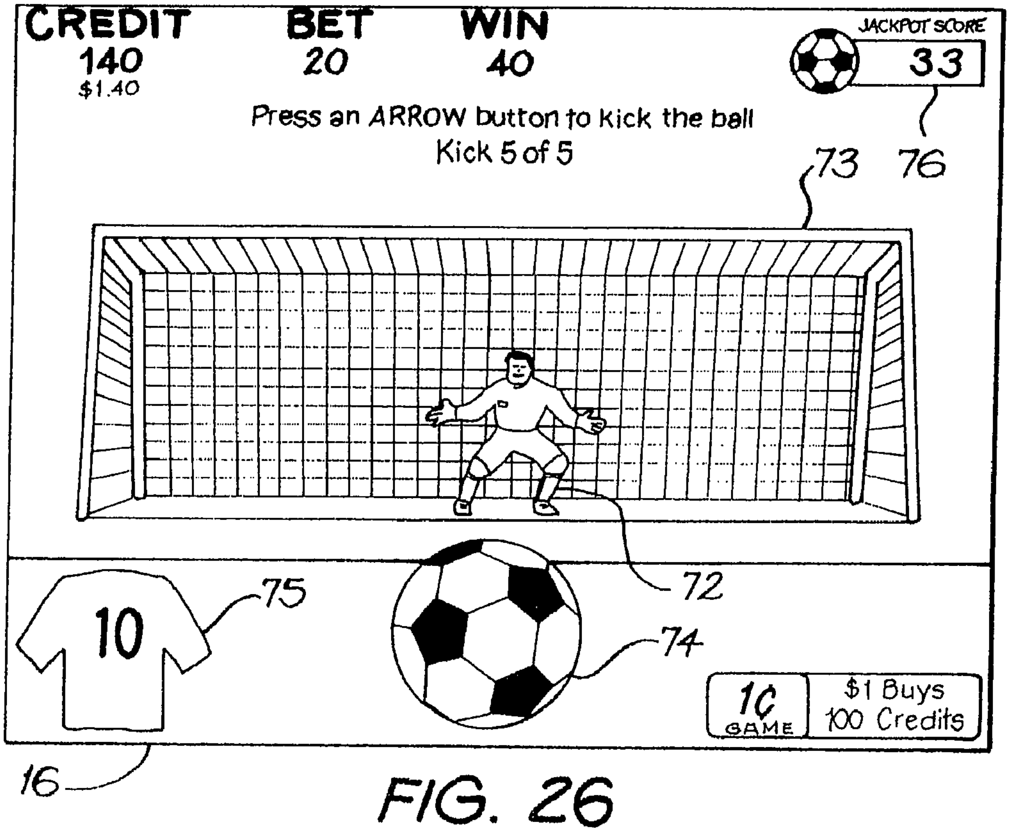
Figure 27:
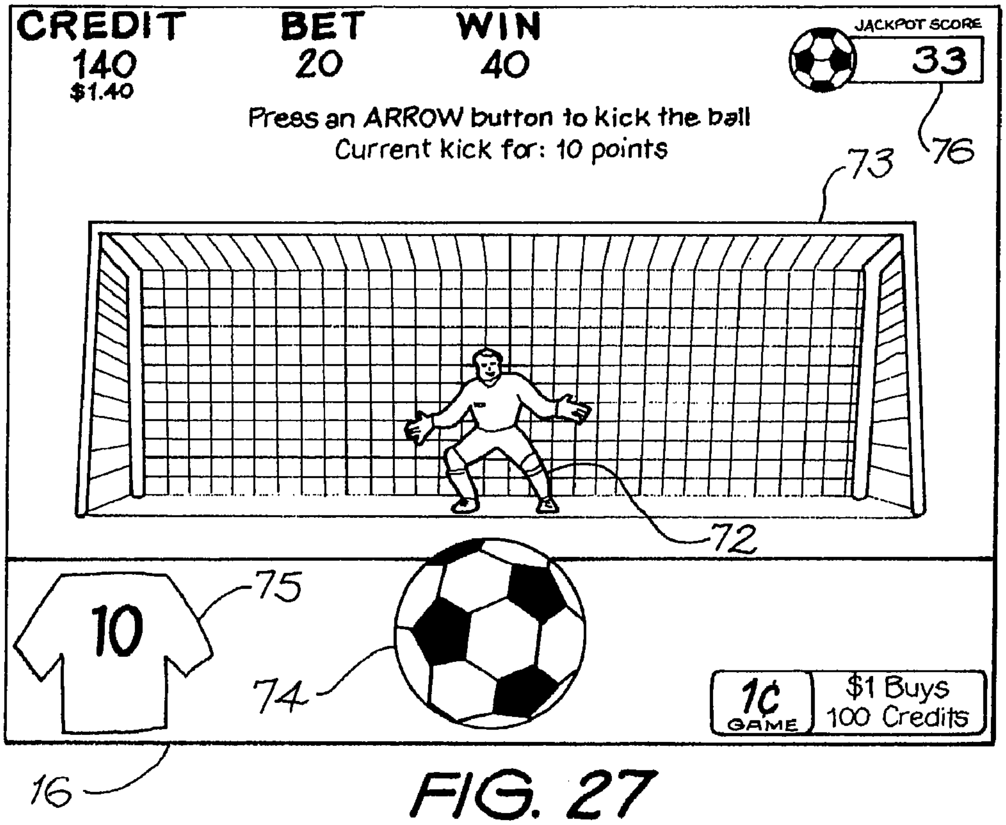
Figure 28:
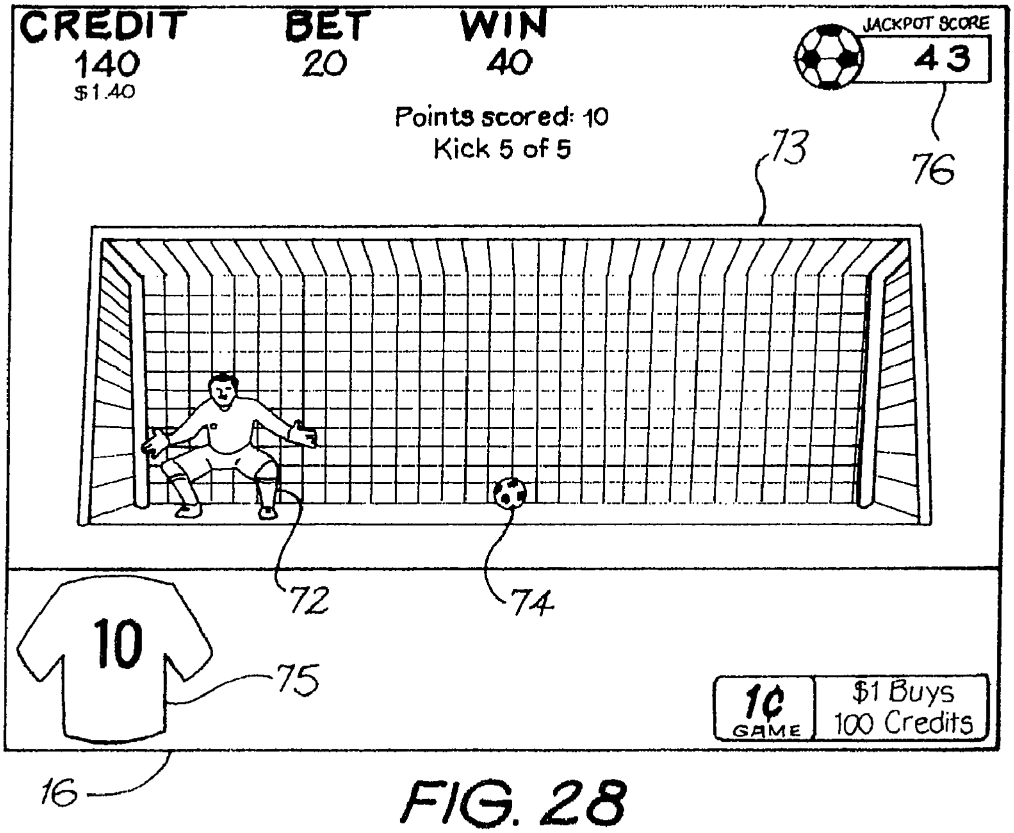

As illustrated in FIG. 20, a second additional random bonus feature is provided as part of the game in which the video-player, after having taken a kick as part of the normal bonus game sequence, is awarded a free kick as shown by a banner 79. A free kick may be awarded whether or not the previous kick in the normal bonus game sequence was successful and will occur with a 20% probability after each game sequence. In the free kick sequence, the video-player which took the last kick will be awarded the free kick and hence the potential score for the free kick in this example is 11. However, in other instances where a different video-player had taken the previous kick, the score will correspond to that video-player's shirt number. FIG. 21 illustrates the screen prior to the game player selecting a direction for the ball to be kicked and FIG. 22 shows that in this case the video-player has successfully kicked the ball to the centre of the goals while the goalie 72 has moved in the wrong direction thereby missing the save. Due to the successful outcome, the game player has scored 11 points which are added to the total on the jackpot score meter 76.

The two sequences shown in FIGS. 23 to 28 follow the same pattern as the first three games sequences and illustrate fourth and fifth shot sequences respectively. In the illustrated examples these shots were taken by video-player 4 and video-player 10 respectively. In the examples given, the game player has managed to score a goal in each case and 14 points in total are added to the jackpot score meter 76.

Once the game player has been given five bonus game sequences, the jackpot score on the meter 76 is compared with a series of score ranges or bands and an appropriate jackpot prize is awarded. These bands or ranges are:

| | |
|---|---|
| 0-34 | Mini jackpot; |
| 35-54 | Minor jackpot; |
| 55-64 | Major jackpot; and |
| 65 upwards | Grand jackpot. |

Figure 29:
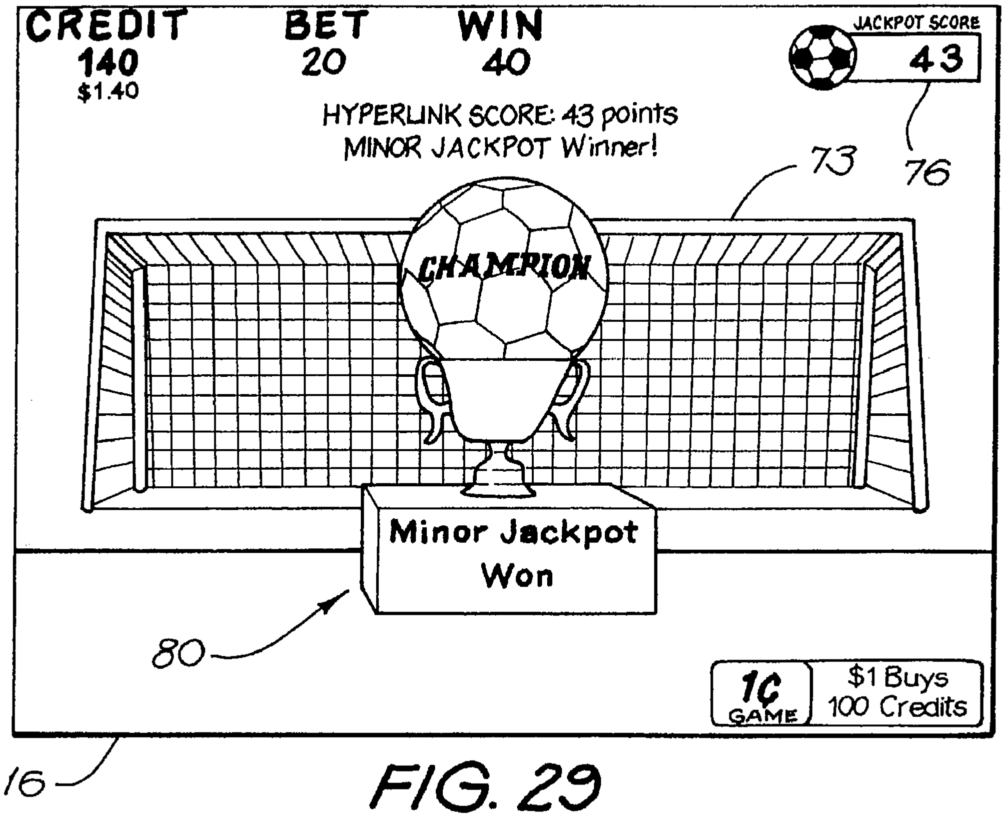

In this case, because a total of 43 points were scored, a minor jackpot has been won as indicated by the trophy 80 appearing in the middle of the screen as shown in FIG. 29. It is to be noted that, even if the game player obtains zero points after completion of all of the sequences of the bonus game, the game player is still awarded the mini jackpot.

Figure 30:
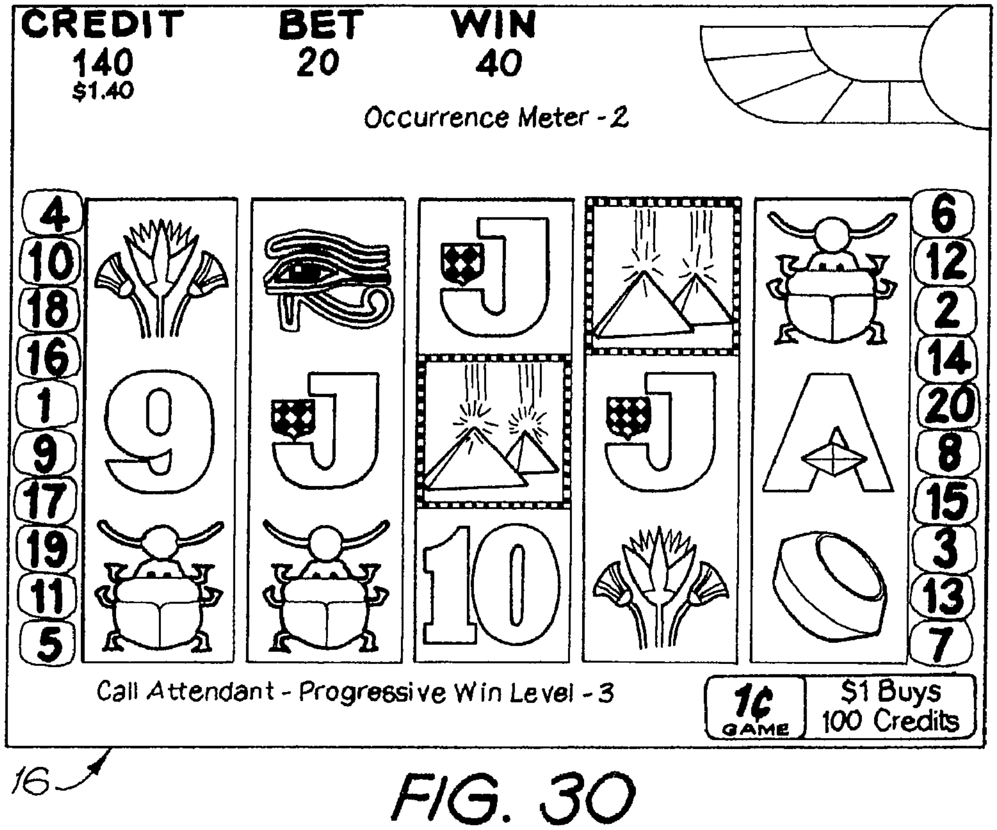
Figure 31:
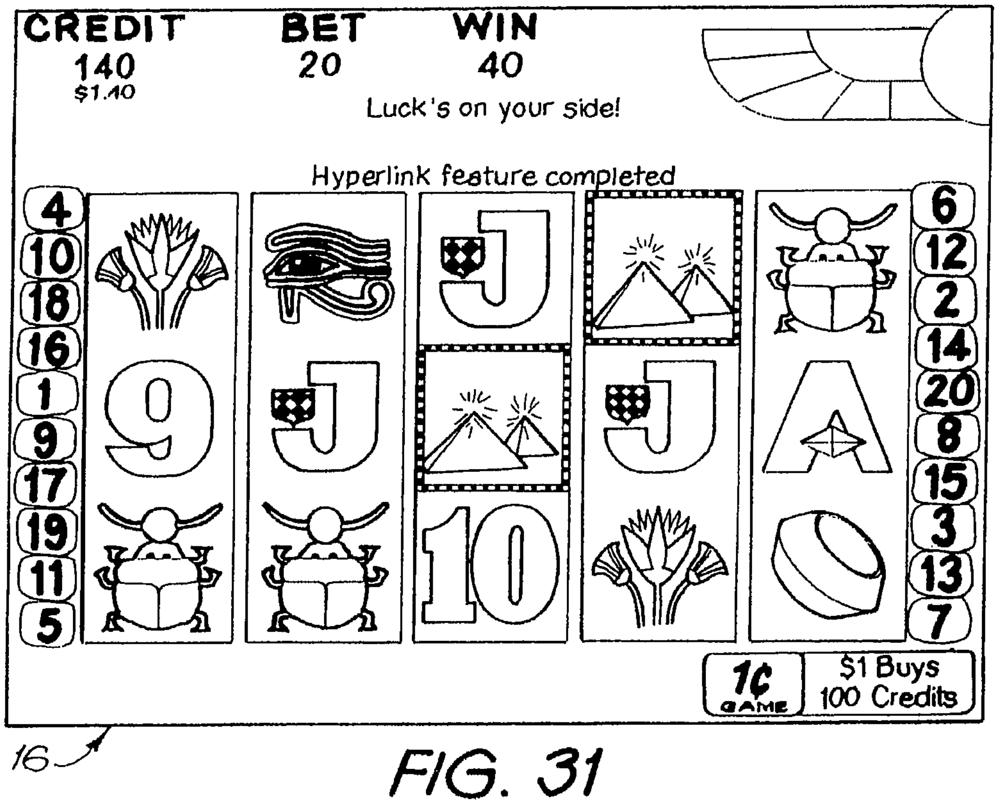
Figure 32:
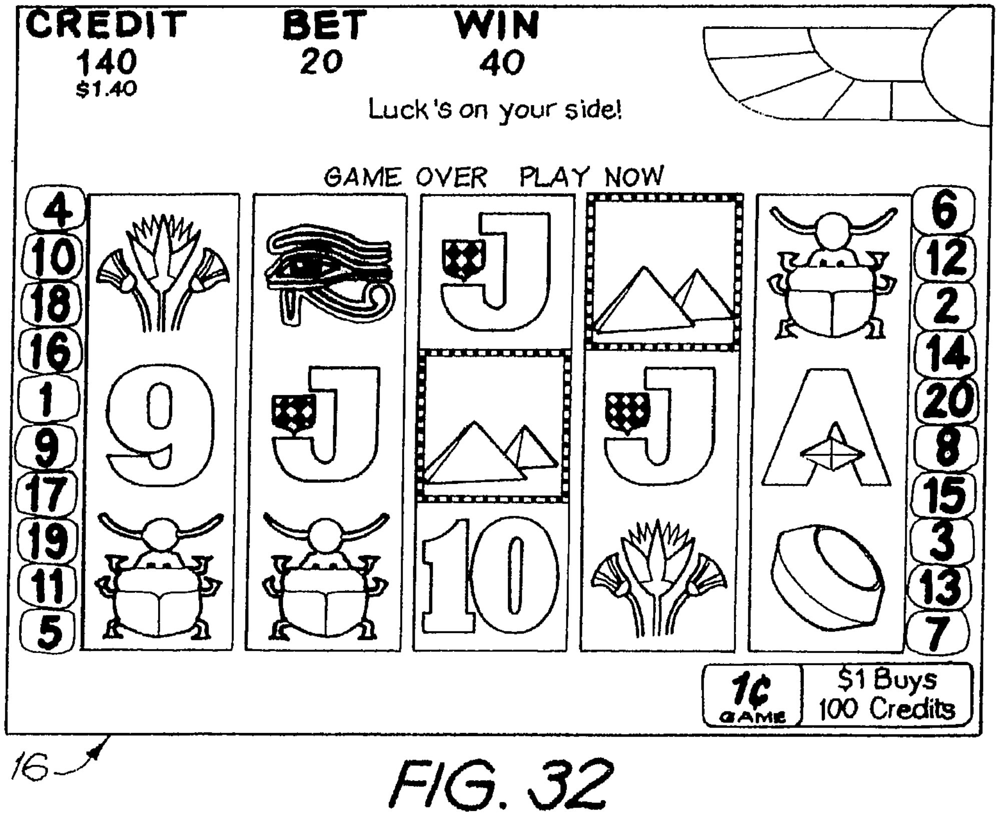

Once the hyperlink progressive feature has been completed, the gaming machine returns to the base game that was being played immediately prior to the hyperlink sequence commencing, and it will be noted in FIG. 30 that the base game screen now has a message at the bottom indicating that the game player should call an attendant to claim their progressive prize which is a level 3 win. It will be noted that no prize has been added to the credit and win counters at the top of the screen and this is because on this occasion the gaming establishment pays progressive jackpots directly to the game player and not via the machine. Of course it would be possible to add the jackpot prize to the credit meter if such an arrangement is allowable in the particular jurisdiction and is the method of operation preferred by the gaming establishment. In the case of manual pay, the machine will lock in the state shown in FIG. 30 until the attendant has come and paid the jackpot at which time the attendant will unlock the machine and the screen will then display the image shown in FIG. 31 indicating that the hyperlink feature has been completed. As illustrated in FIG. 32, the machine will then progress to a screen where it invites the game player to recommence playing the base game.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine which comprises a display, a game player input and a game controller arranged to control images displayed on the display, the game controller controlling play of a game in which a winning game result causes a prize to be awarded to a game player, wherein the game comprises an interactive sequence relating to a tournament in which a representation of a first video-player of one team is displayed, the first video-player having an associated indicium, an action of the first video-player to be executed being selected by the game player via the game player input and in which the game controller selects an action to be performed by another video-player and, depending on an outcome resulting from the selected actions, an award is made to the game player of a number of points represented by the indicium.

2. The gaming machine of claim 1 in which the game comprises a plurality of game sequences each of which is awarded points.

3. The gaming machine of claim 2 in which the points are accumulated and a prize awarded depending on the number of points accumulated by one of (a) the end of the game sequences and (b) when some other predetermined milestone has been reached.

4. The gaming machine of claim 3 in which the prize to be awarded is dependent on in which one of a plurality of ranges of values the accumulated points tally falls.

5. The gaming machine of claim 4 in which the ranges correspond to different categories of jackpot pools with a top range corresponding to a top jackpot pool, and the other ranges corresponding to jackpot pools of correspondingly lower values, at least the top jackpot being a progressive pool.

6. The gaming machine of claim 1 in which the action selected by the gaming machine in response to the game player selected action is an action by a video-player in the same team or the opposing team depending on the type of tournament.

7. The gaming machine of claim 6 in which the action required to be selected by the game player is the direction in which a penalty goal in a soccer tournament is to be aimed.

8. The gaming machine of claim 7 in which the controller selected response is to make a goalkeeper move either in a direction to "save" the goal or in a direction to miss saving the goal.

9. The gaming machine of claim 2 in which the game controller randomly selects a video-player in each of the game sequences, the video-player being selected from the team without previously-selected video-players.

10. The gaming machine of claim 1 in which each video-player for which the game player selects an action is allocated by the game controller.

11. The gaming machine of claim 1 in which the game player selects the video-player to take the action.

12. The gaming machine of claim 1 in which a score allocated to a successful game sequence is also related to the action selected by the game player.

13. The gaming machine of claim 1 in which additional bonus points are awarded to the game player if an additional bonus event occurs during a game sequence.

14. The gaming machine of claim 13 in which the additional bonus event is randomly triggered.

15. A gaming system which includes a gaming server;

a plurality of gaming machines; and a communications system connecting each of the plurality of gaming machines to the gaming server, each gaming machine comprising a display, a game player input and a game controller arranged to control images displayed on the display, the game controller controlling play of a game on the gaming machine in which a winning game result causes a prize to be awarded to a game player, wherein the game played on at least one of the gaming machines comprises an interactive sequencer related to a tournament in which a representation of a first video player of one team is displayed, the video-player having an associated indicium, an action of the first video player to be executed being selected by the game layer via the game player input and in which the game controller selects an action to be performed by another video player and, depending on an outcome resulting from the selected actions, an award is made to the game player of a number of points dependent on the indicium.

16. The gaming system of claim 15 in which the game comprises a plurality of game sequences each of which is awarded points.

17. The gaming system of claim 16 in which the points are accumulated and a prize awarded depending on the number of points accumulated by one of (a) the end of the game sequence and (b) when some other predetermined milestone has been reached.

18. The gaming system of claim 17 in which the prize to be awarded is dependent on in which one of a plurality of ranges of values the accumulated points tally falls.

19. The gaming system of claim 18 in which the ranges correspond to different categories of jackpot pools with a top range corresponding to a top jackpot pool, and the other ranges corresponding to jackpot pools of correspondingly lower values, at least the top jackpot being a progressive pool.

20. The gaming system of claim 15 in which the action selected by the gaming system in response to the game player selected action is an action by a video-player in the same team or the opposing team depending on the type of tournament.

21. The gaming system of claim 20 in which the action required to be selected by the game player is the direction in which a penalty goal in a soccer tournament is to be aimed.

22. The gaming system of claim 21 in which the controller selected response is to make a goalkeeper move either in a direction to "save" the goal or in a direction to miss saving the goal.

23. The gaming system of claim 16 in which the game controller randomly selects a video-player in each of the game sequences, the video-player being selected from the team without previously-selected video-players.

24. The gaming system of claim 15 in which each video-player for which the game player selects an action is allocated by the game controller.

25. The gaming system of claim 15 in which the game player selects the video-player to take the action.

26. The gaming system of claim 15 in which a score allocated to a successful game sequence is also related to the action selected by the game player.

27. The gaming system of claim 15 in which additional bonus points are awarded to the game player if an additional bonus event occurs during a game sequence.

28. The gaming system of claim 27 in which the additional bonus event is randomly triggered.

29. The gaming system of claim 15 which includes a player tracking arrangement in communication with the gaming machines and the gaming server via the communications network.

30. The gaming machine of claim 1 wherein a probability of a successful outcome resulting from the selected actions is dependent on the indicium associated with the video-player.

31. A gaming machine which comprises a display, a game player input and a game controller arranged to control images displayed on the display, the game controller controlling play of a game in which a winning game result causes a prize to be awarded to a game player, wherein the game comprises an interactive sequence relating to a tournament in which the game controller randomly selects a first video-player of one team, a representation of the first video-player of one team is displayed, the first video-player having an associated indicium, an action of the first video-player to be executed being selected by the game player via the game player input and in which the game controller selects an action to be performed by another video-player and, depending on an outcome resulting from the selected actions, an award is made to the game player of a number of points represented by the indicium.

32. A gaming system which includes a gaming server;

a plurality of gaming machines; and a communications system connecting each of the plurality of gaming machines to the gaming server, each gaming machine comprising a display, a game player input and a game controller arranged to control images displayed on the display, the game controller controlling play of a game on the gaming machine in which a winning game result causes a prize to be awarded to a game player, wherein the game played on at least one of the gaming machines comprises an interactive sequence related to a tournament in which a first video-player of one team is randomly selected, a representation of the first video-player of one team is displayed, the video-player having an associated indicium, an action of the first video player to be executed being selected by the game player via the game player input and in which the game controller selects an action to be performed by another video player and, depending on an outcome resulting from the selected actions, an award is made to the game player of a number of points dependent on the indicium.

* * * * *